(12) United States Patent
Schreier et al.

(10) Patent No.: US 11,875,087 B2
(45) Date of Patent: *Jan. 16, 2024

(54) PROCESSING SYSTEM HAVING A MACHINE LEARNING ENGINE FOR PROVIDING AN OUTPUT VIA A DIGITAL ASSISTANT SYSTEM

(71) Applicant: Allstate Insurance Company, Northbrook, IL (US)

(72) Inventors: Elizabeth C. Schreier, Glenview, IL (US); Jamie E. Grahn, Lakemoor, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/111,712

(22) Filed: Feb. 20, 2023

(65) Prior Publication Data

US 2023/0280973 A1   Sep. 7, 2023

Related U.S. Application Data

(63) Continuation of application No. 15/921,968, filed on Mar. 15, 2018, now Pat. No. 11,586,415.

(51) Int. Cl.
  *G10L 17/22* (2013.01)
  *G06F 3/16* (2006.01)
  (Continued)

(52) U.S. Cl.
  CPC ............ *G06F 3/167* (2013.01); *G06F 3/0482* (2013.01); *G06N 20/00* (2019.01); *G10L 15/22* (2013.01); *G10L 17/22* (2013.01); *H04W 4/021* (2013.01)

(58) Field of Classification Search
  CPC .. G06Q 10/06311; G06N 20/00; H04W 4/021
  (Continued)

(56) References Cited

U.S. PATENT DOCUMENTS

| 8,706,503 B2 | 4/2014 | Cheyer et al. |
| 8,731,942 B2 | 5/2014 | Cheyer et al. |

(Continued)

FOREIGN PATENT DOCUMENTS

WO   WO-2008034111 A2   3/2008

OTHER PUBLICATIONS

Elgan M., "These Three Virtual Assistants Point the Way to the Future," Computer World, Jun. 8, 2016, Retrieved from URL: https://www.computerworld.com/article/3078829/artificial-intelligence/these-three-virtual-assistants, Accessed on Mar. 13, 2018, 10 Pages.

(Continued)

*Primary Examiner* — Jakieda R Jackson
(74) *Attorney, Agent, or Firm* — Polsinelli PC

(57) ABSTRACT

Aspects of the disclosure relate to generating outputs using a digital personal assistant computing control platform and machine learning. A computing platform may receive, from a digital personal assistant computing device, a first voice command input. The computing platform may then determine, via machine learning algorithms, an identifier output indicating a user associated with the first voice command input and a location output indicating a geographic location associated with the user. The computing platform may determine, via a stored calendar, an availability output indicating availability associated with the user. Based on the identifier output, the location output, and the availability output, a charitable opportunity output indicating a charitable opportunity may be determined by the computing platform and may be transmitted to a computing device associated with the charitable opportunity. Acceptance of the (Continued)

opportunity may be received and the computing platform may update the stored calendar to include the charitable opportunity.

20 Claims, 18 Drawing Sheets

(51) Int. Cl.
G06F 3/0482 (2013.01)
H04W 4/021 (2018.01)
G10L 15/22 (2006.01)
G06N 20/00 (2019.01)

(58) Field of Classification Search
USPC .......................................................... 704/275
See application file for complete search history.

(56) References Cited

U.S. PATENT DOCUMENTS

| | | | |
|---|---|---|---|
| 9,129,266 | B2 | 9/2015 | Nagaraj |
| 9,754,579 | B1 | 9/2017 | McCobb et al. |
| 2002/0188960 | A1 | 12/2002 | Rodriguez et al. |
| 2005/0055264 | A1 | 3/2005 | Gallick et al. |
| 2007/0192116 | A1 | 8/2007 | Lovitt |
| 2008/0065513 | A1 | 3/2008 | McHale et al. |
| 2010/0241476 | A1 | 9/2010 | Fitzpatrick et al. |
| 2010/0262475 | A1 | 10/2010 | Gavriline et al. |
| 2012/0271676 | A1 | 10/2012 | Aravamudan et al. |
| 2013/0024203 | A1 | 1/2013 | Flores et al. |
| 2013/0151637 | A1 | 6/2013 | Bedikian |
| 2013/0159445 | A1 | 6/2013 | Zonka et al. |
| 2013/0174171 | A1 | 7/2013 | Doster et al. |
| 2013/0179460 | A1 | 7/2013 | Acuña et al. |
| 2013/0311997 | A1 | 11/2013 | Gruber et al. |
| 2014/0164312 | A1 | 6/2014 | Lynch et al. |
| 2014/0244533 | A1 | 8/2014 | Kollar et al. |
| 2014/0343950 | A1 | 11/2014 | Simpson et al. |
| 2015/0058324 | A1 | 2/2015 | Kauwe |
| 2015/0082242 | A1 | 3/2015 | Antipa |
| 2015/0248651 | A1 | 9/2015 | Akutagawa et al. |
| 2015/0278348 | A1 | 10/2015 | Paruchuri et al. |
| 2016/0379105 | A1 | 12/2016 | Moore, Jr. et al. |
| 2017/0060388 | A1 | 3/2017 | Einaudi |
| 2017/0309273 | A1 | 10/2017 | Jones et al. |
| 2017/0322885 | A1 | 11/2017 | Mukherjee et al. |
| 2018/0040319 | A1 | 2/2018 | Rotman |
| 2018/0096402 | A1 | 4/2018 | Shankar |

OTHER PUBLICATIONS

"Giventure: Your Personal Assistant for Volunteering," Kickstarter, Retrieved from the Internet URL: https://www.kickstarter.com/projects/714737278/jiventure-your-personal-assistant-for-volunteering, Website Visited Mar. 13, 2018, 12 Pages.

"Top 12 AI Personal Assistant Apps for Android," Applikely, Jan. 9, 2018, Retrieved from the Internet URL: https://applikeysolutions.com/blog/top-12-ai-personal-assistant-apps-for-android, Accessed on Mar. 13, 2018, 10 Pages.

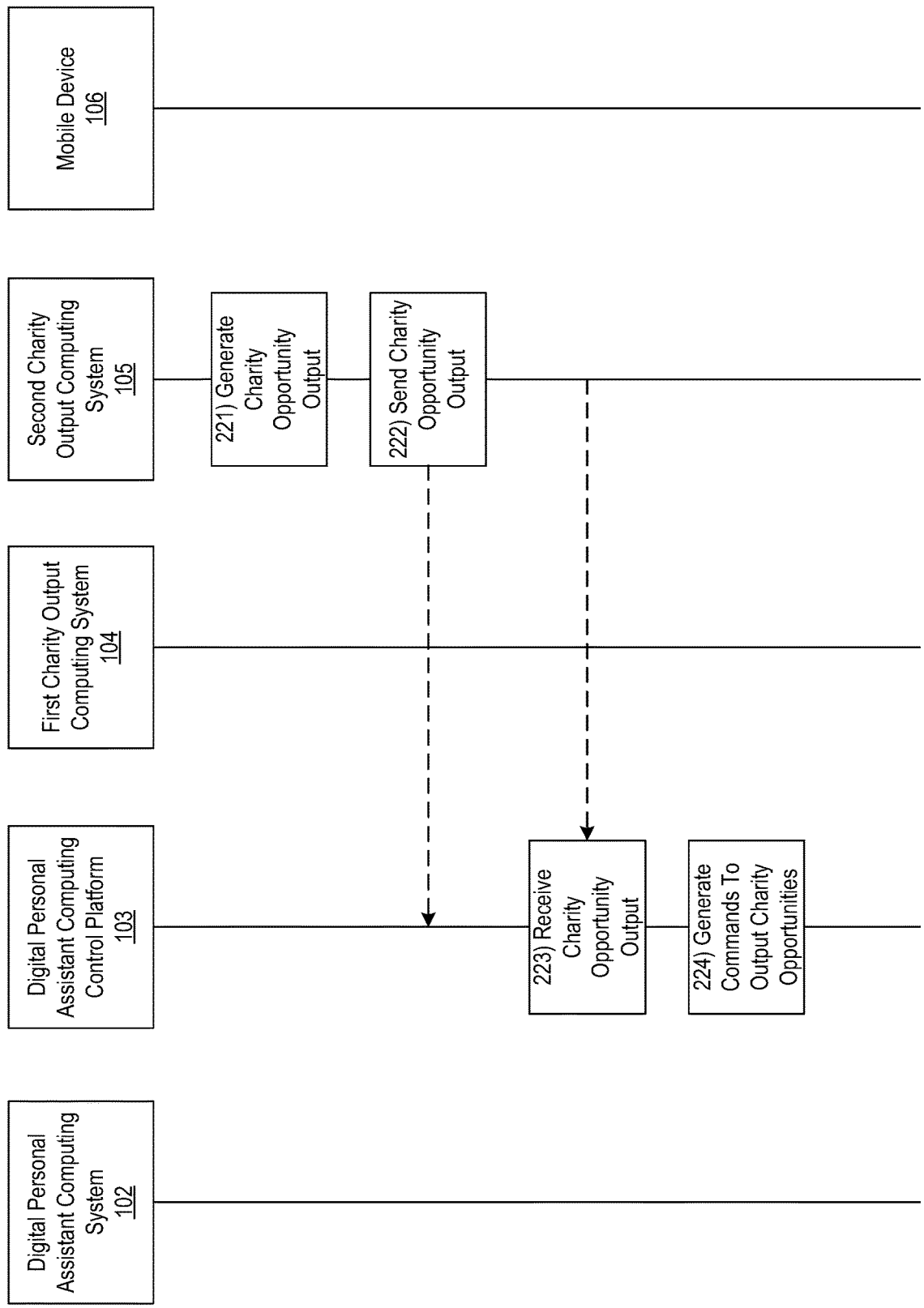

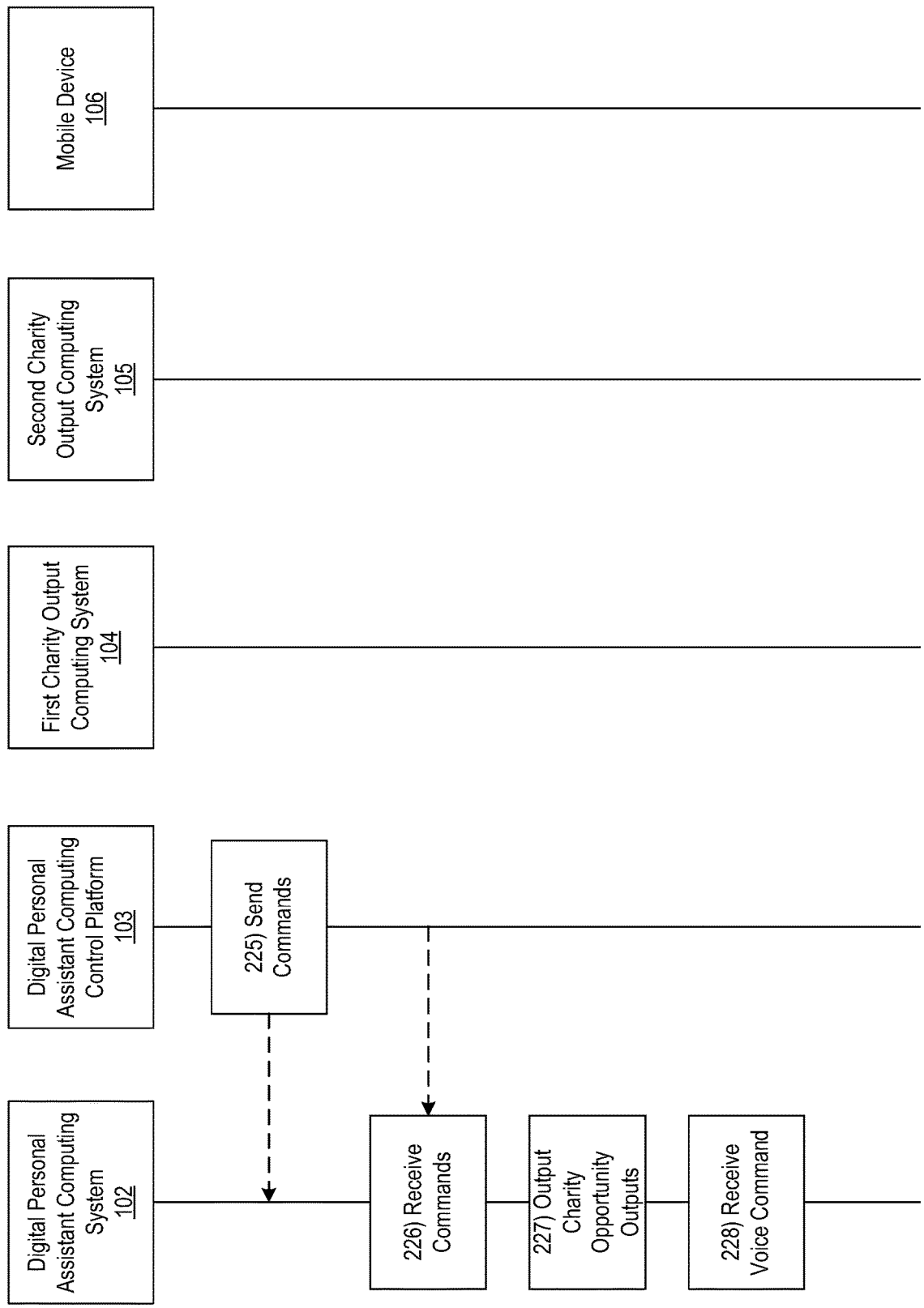

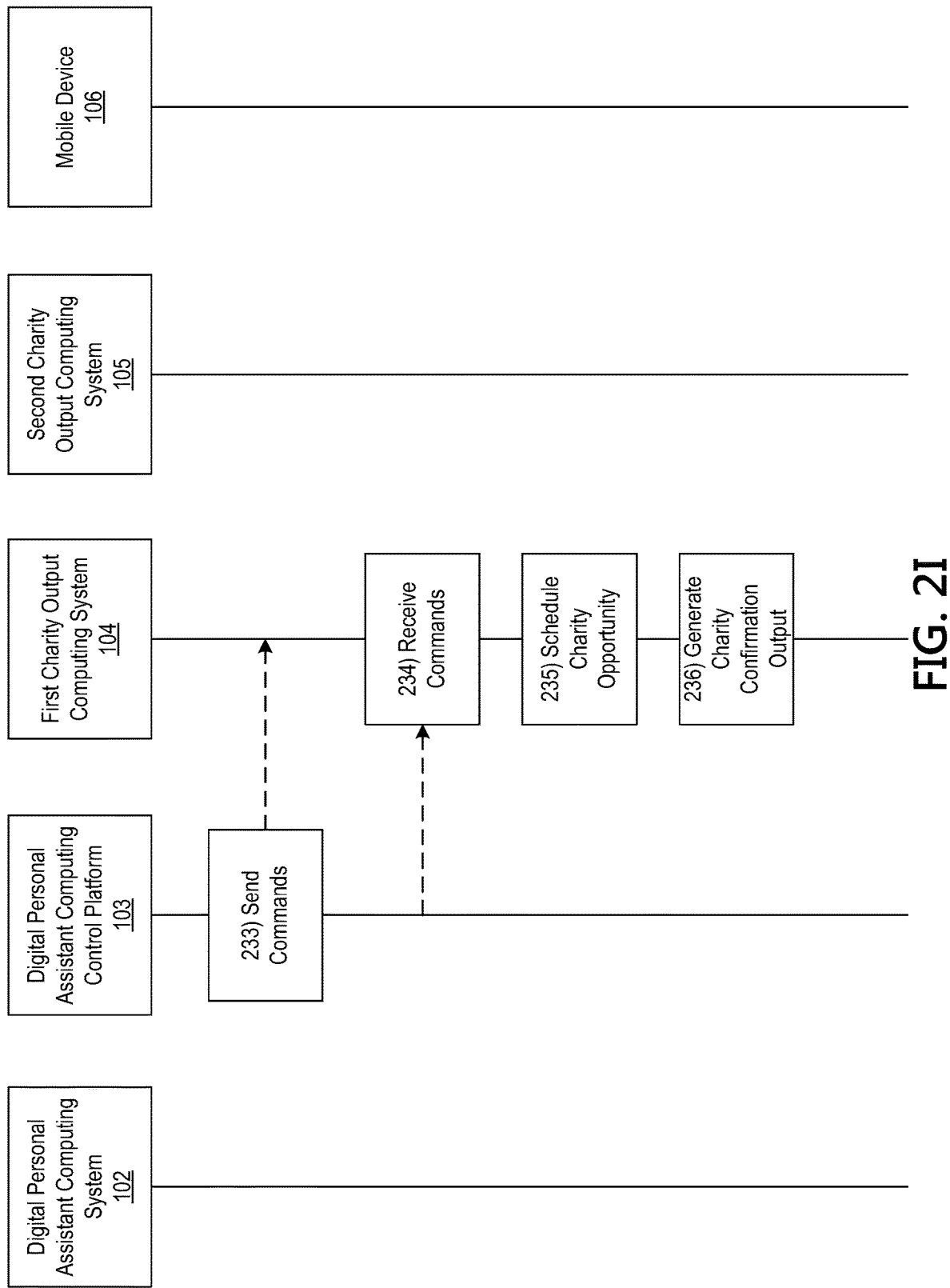

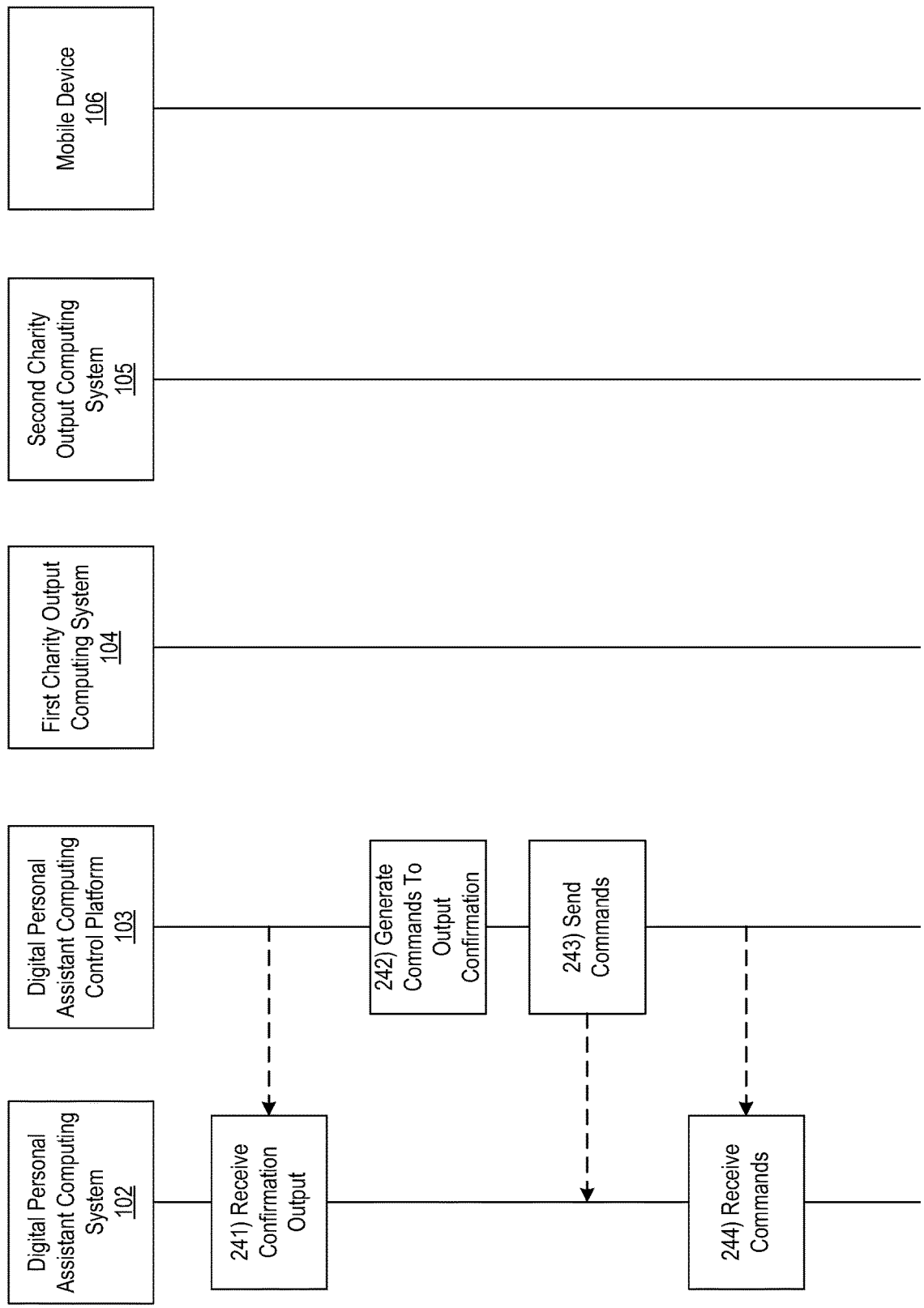

… (1)

PROCESSING SYSTEM HAVING A MACHINE LEARNING ENGINE FOR PROVIDING AN OUTPUT VIA A DIGITAL ASSISTANT SYSTEM

CROSS-REFERENCE TO RELATED APPLICATIONS

The present application is a continuation of and claims priority to U.S. patent application Ser. No. 15/921,968 filed on Mar. 15, 2018, which is incorporated by reference in its entirety herein.

BACKGROUND

Aspects of the disclosure relate to processing systems. In particular, aspects of the disclosure relate to processing systems having a machine learning engine and machine learning datasets to generate altruistic recommendations or outputs that may be provided via a digital assistant system.

Computing devices receive data associated with characteristics of a user and the user's surroundings. Digital assistants are often used by people to process or distill data, provide information or recommendations, and the like. Users may not be aware of how to best fit charity or other altruistic endeavors into their daily lives. Accordingly, it would be advantageous to control the computing devices with regard to data collection and output, and to aggregate the data to determine charitable or altruistic opportunity recommendations or outputs and provide those recommendations via a digital assistant. This may increase the amount of time users may devote to charity.

SUMMARY

Aspects of the disclosure provide effective, efficient, scalable, and convenient technical solutions that address and overcome the technical problems associated with leveraging machine learning techniques and data collection to determine charitable outputs.

In accordance with one or more embodiments, a computing platform comprising at least one processor, a communication interface communicatively coupled to the at least one processor, and memory may receive, from a digital personal assistant computing device, a first voice command input. Then, the computing platform may determine, via machine learning algorithms, an identifier output indicating a user associated with the first voice command input. The computing platform may determine a location output indicating a geographic location associated with the user. The computing platform may determine, via a stored calendar, an availability output indicating availability associated with the user. The computing platform may determine, based on the identifier output, the location output, and the availability output, a charitable or altruistic opportunity output indicating a charitable or altruistic recommendation or opportunity. In addition, the computing platform may transmit, to a computing device associated with the charitable or altruistic recommendation or opportunity and after receiving a second voice command input from the digital personal assistant computing device that indicates acceptance of the charitable or altruistic recommendation or opportunity, an acceptance input. The computing platform may update, after transmitting the acceptance input, the stored calendar to include the charitable or altruistic recommendation or opportunity. Subsequently, the computing platform may transmit, after updating the stored calendar and to the digital personal assistant computing device, one or more commands to notify the user of the updated stored calendar.

In some embodiments, the digital personal assistant computing device may comprise a computing device with voice recognition capabilities and natural language understanding capabilities.

In some embodiments, the computing platform may determine, based on the location output, one or more charitable or altruistic outputs comprising indications of charitable organizations and charitable events located within a predetermined distance of the geographic location associated with the user.

In some embodiments, the computing platform may send, to the computing device associated with the charitable or altruistic opportunity, the availability output.

In some embodiments, the computing platform may receive, from the computing device associated with the charitable or altruistic opportunity and in response to the availability output, the charitable or altruistic opportunity output.

In some embodiments, the computing platform may generate one or more commands to output the charitable or altruistic opportunity and may send, to the personal assistant computing device, the one or more commands to output the charitable or altruistic opportunity.

In some embodiments, the computing platform may transmit the acceptance input by transmitting, after the sending the one or more commands to output the charitable or altruistic opportunity.

In some embodiments, the computing platform may receive, from the digital personal assistant computing device, the second voice command input and may determine that the second voice command input indicates acceptance of the charitable or altruistic opportunity.

In some embodiments, the acceptance input comprises one or more commands to schedule the charitable or altruistic opportunity.

In some embodiments, the computing platform may receive a confirmation output comprising an indication that the charitable or altruistic opportunity has been scheduled.

In some embodiments, the computing platform may update the stored calendar by updating, after receiving the confirmation output, the stored calendar.

In some embodiments, the computing platform may send, to a mobile device, an indication of the updated stored calendar.

In some embodiments, the digital personal assistant computing device may comprise the mobile device.

In accordance with one or more embodiments, a digital personal assistant computing device control system may determine, via a stored calendar, an availability output indicating availability associated with a user. Next, the digital personal assistant computing device control system may determine a location output indicating a geographic location associated with the user. In addition, the digital personal assistant computing device control system may determine, after determining the availability output, a charitable or altruistic opportunity output indicating a charitable or altruistic opportunity. Subsequently, the digital personal assistant computing device control system may generate one or more commands directing a digital personal assistant computing device to output an indication of the charitable or altruistic opportunity output. Next, the digital personal assistant computing device control system may transmit, to the digital personal assistant computing device, the one or more commands directing the personal digital assistant computing device to output the indication of the charitable or altruistic opportunity output. Then, the digital personal assistant computing device control system may receive, from the digital personal assistant computing device, one or more commands to schedule the charitable or altruistic opportunity. In addition, the digital personal assistant computing device control system may generate one or more commands directing a charity output computing system to schedule the charitable or altruistic opportunity. Subsequently, the digital personal assistant computing device control system may transmit, to the charity output computing system, the one or more commands directing the charity output computing system to schedule the charitable or altruistic opportunity. Then, the digital personal assistant computing device control system may receive, from the charity output computing system, a confirmation output.

In some embodiments, the digital personal assistant computing device control system may determine that a voice command has not been received within a predetermined period of time.

In some embodiments, the digital personal assistant computing device control system may determine the availability output by determining, in response to determining that the voice command has not been received within the predetermined period of time, the availability output.

In one or more embodiments, a digital personal assistant computing device control system may determine a charitable or altruistic opportunity output indicating a charitable or altruistic opportunity. Next, the digital personal assistant computing device control system may receive an acceptance input. Then, the digital personal assistant computing device control system may generate, after receiving the acceptance input, one or more commands directing a charity output computing system to schedule the charitable or altruistic opportunity. Subsequently, the digital personal assistant computing device control system may transmit, to the charity output computing system, the one or more commands directing the charity output computing system to schedule the charitable or altruistic opportunity. In addition, the digital personal assistant computing device control system may update, after transmitting the one or more commands directing the charity output computing system to schedule the charitable or altruistic opportunity, a stored calendar to include the charitable or altruistic opportunity. Then, the digital personal assistant computing device control system may transmit, after updating the stored calendar and to a digital personal assistant computing device, one or more commands to notify a user of the updated stored calendar.

In some embodiments, the digital personal assistant computing device control system may determine a second charitable or altruistic opportunity output indicating a second charitable or altruistic opportunity. The digital personal assistant computing device control system may determine that an acceptance input associated with the second charitable or altruistic opportunity output was not received. The digital personal assistant computing device control system may determine that the second charitable or altruistic opportunity should not be scheduled.

In some embodiments, the charitable or altruistic opportunity may comprise one of: making a donation, going to an event, and performing a random act of kindness.

In some embodiments, the digital personal assistant computing device control system may determine, prior to determining the charitable or altruistic opportunity output, a target recipient of the charitable or altruistic opportunity.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2L depict an illustrative event sequence for determining charitable or altruistic outputs in accordance with one or more example embodiments;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

In summary, users may not be aware of how to best fit charity or other altruistic endeavors into their daily lives. Digital assistants are often used by people to process or distill data, provide information or recommendations, and the like, and may be useful in incorporating charity or other altruistic endeavors into one's schedule. For example, a digital personal assistant computing device may receive a voice command. In response to the voice command, the digital personal assistant computing device may determine a user, and subsequently may determine calendar and other data associated with the user. The digital personal assistant computing device may evaluate this data to determine charity or altruistic opportunities. After determining the charity or altruistic opportunities, the digital personal assistant computing device may determine a charity or altruistic opportunity output that recommends an opportunity to the user.

Figure 1A:
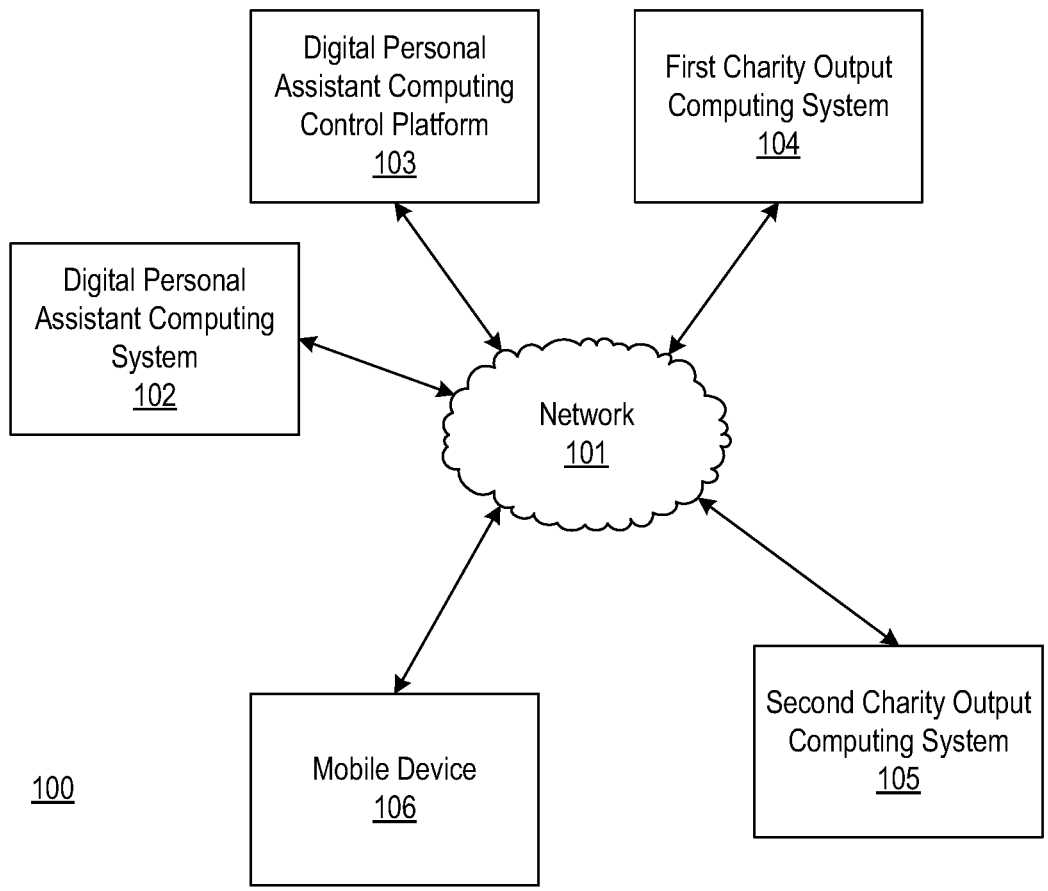
FIGS. 1A and 1B depict an illustrative computing environment for determining charitable or altruistic outputs in accordance with one or more example embodiments.
Figure 1B:
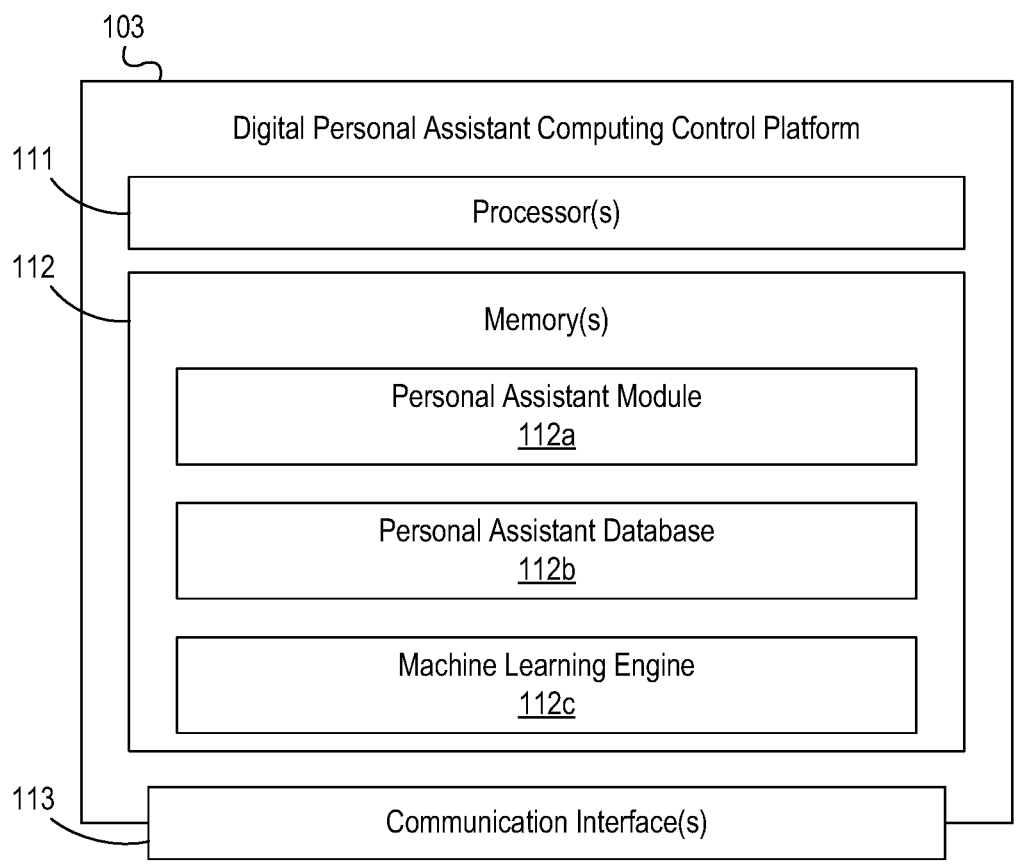

FIGS. 1A and 1B depict an illustrative computing environment for generating a charitable or altruistic opportunity output in accordance with one or more example embodiments. Referring to FIG. 1A, computing environment 100 may include one or more computer systems. For example, computing environment 100 may include a digital personal assistant computing system 102, a digital personal assistant computing control platform 103, a first charity output computing system 104, a second charity output computing system 105, and a mobile device 106.

Digital personal assistant computing system 102 may be a personal computing device (e.g., voice recognition digital personal assistant computer having natural language recognition or understanding, desktop computer, laptop computer)

or mobile computing device (e.g., smartphone, tablet) that may be linked to and/or used by a first user (who may, e.g., be affiliated with an organization operating digital personal assistant computing control platform 103).

As illustrated in greater detail below, digital personal assistant computing control platform 103 may include one or more computing devices configured to perform one or more of the functions described herein. For example, digital personal assistant computing control platform 103 may include one or more computers (e.g., laptop computers, desktop computers, servers, server blades, or the like) and/or other computer components (e.g., processors, memories, communication interfaces). In addition, and as illustrated in greater detail below, digital personal assistant computing control platform 103 may be configured to generate user interface information (which may, e.g., include user interface templates, user interface elements, user interface content, and/or other data) to cause one or more other computer systems to display and/or otherwise present one or more user interfaces. The user interface information may also cause one or more other computer systems to present an audio output. In some instances, the user interfaces and/or corresponding user interface information generated by digital personal assistant computing control platform 103 may be associated with a client portal provided by an organization, such as an online charitable portal. Such a portal may, for instance, provide users with access to charitable or altruistic opportunities (e.g., donation opportunities, charitable events, random acts of kindness, volunteer opportunities, and the like).

First charity output computing system 104 may include one or more computers (e.g., laptop computers, desktop computers, servers, server blades, or the like) and/or other computer components (e.g., processors, memories, communication interfaces). In some instances, first charity output computing system 104 may be associated with a client portal provided by a first organization, such as an online charitable portal. Such a portal may, for instance, provide users with access to charitable opportunities (e.g., donation opportunities, charitable events, volunteer opportunities, random acts of kindness, and the like). Second charity output computing system 105 may include one or more computers (e.g., laptop computers, desktop computers, servers, server blades, or the like) and/or other computer components (e.g., processors, memories, communication interfaces). In some instances, second charity output computing system 105 may be associated with a client portal provided by a second organization, such as an online charitable portal. Such a portal may, for instance, provide users with access to charitable opportunities (e.g., donation opportunities, charitable events, volunteer opportunities, random acts of kindness, and the like).

Mobile device 106 may be, for example, a smartphone, a tablet, and the like that may be linked to and/or used by a user (who may, e.g., be affiliated with an organization operating first charity output computing system 104 and/or second charity output computing system 105). Mobile device 106 may also be linked to digital personal assistant computing control platform 103.

Computing environment 100 also may include one or more networks, which may interconnect one or more of digital personal assistant computing system 102, digital personal assistant computing control platform 103, first charity output computing system 104, second charity output computing system 105, and mobile device 106, and/or one or more other systems, public networks, sub-networks, and/or the like. For example, computing environment 100 may include a network 101.

In some examples, digital personal assistant computing system 102, may be a digital assistant having cloud based voice recognition and/or natural language capabilities (AMAZON ALEXA™, GOOGLE HOME™, SIRI®, and the like). For example, the digital personal assistant computing system 102 may be able to receive voice commands, play music, answer questions, manage a calendar, control smart home devices, and the like. In other examples, digital personal assistant computing system 102 may be any type of computing device capable of receiving a user interface, receiving input via the user interface, and/or communicating the received input to one or more other computing devices. For example, the systems included in computing environment 100 may, in some instances, be and/or include server computers, desktop computers, laptop computers, tablet computers, smart phones, or the like that may include one or more processors, memories, communication interfaces, storage devices, and/or other components.

In one or more arrangements, mobile device 106 and/or the other systems included in computing environment 100 may be any type of computing device capable of receiving a user interface, receiving input via the user interface, and/or communicating the received input to one or more other computing devices. For example, the systems included in computing environment 100 may, in some instances, be and/or include server computers, desktop computers, laptop computers, tablet computers, smart phones, voice recognition personal assistant computing devices having natural language recognition or understanding, or the like that may include one or more processors, memories, communication interfaces, storage devices, and/or other components. As noted above, and as illustrated in greater detail below, any and/or all of digital personal assistant computing system 102, digital personal assistant computing control platform 103, first charity output computing system 104, second charity output computing system 105, and mobile device 106 may, in some instances, be special-purpose computing devices configured to perform specific functions.

Referring to FIG. 1B, digital personal assistant computing control platform 103 may include one or more processors 111, memory 112, and communication interface 113. A data bus may interconnect processor 111, memory 112, and communication interface 113. Communication interface 113 may be a network interface configured to support communication between digital personal assistant computing control platform 103 and one or more networks (e.g., network 101, or the like). Memory 112 may include one or more program modules having instructions that when executed by processor 111 cause digital personal assistant computing control platform 103 to perform one or more functions described herein and/or one or more databases that may store and/or otherwise maintain information which may be used by such program modules and/or processor 111. In some instances, the one or more program modules and/or databases may be stored by and/or maintained in different memory units of digital personal assistant computing control platform 103 and/or by different computing devices that may form and/or otherwise make up digital personal assistant computing control platform 103. For example, memory 112 may have, store, and/or include a digital personal assistant module 112a, a digital personal assistant database 112b, and a machine learning engine 112c. Digital personal assistant module 112a may have instructions that direct and/or cause digital personal assistant computing control platform 103 to determine charity or altruistic opportunities for a user, as discussed in greater detail below. Digital personal assistant database 112b may store information used by digital personal assistant module 112a and/or digital personal assistant computing control platform 103 in determining charity or altruistic opportunities for the user and/or in performing other functions. Machine learning engine 112c may have instructions that direct and/or cause the digital personal assistant computing control platform 103 to determine charity or altruistic opportunities and to set, define, and/or iteratively redefine optimization rules techniques and/or other parameters used by the digital personal assistant computing control platform 103 and/or other systems in computing environment 100.

Figure 2A:
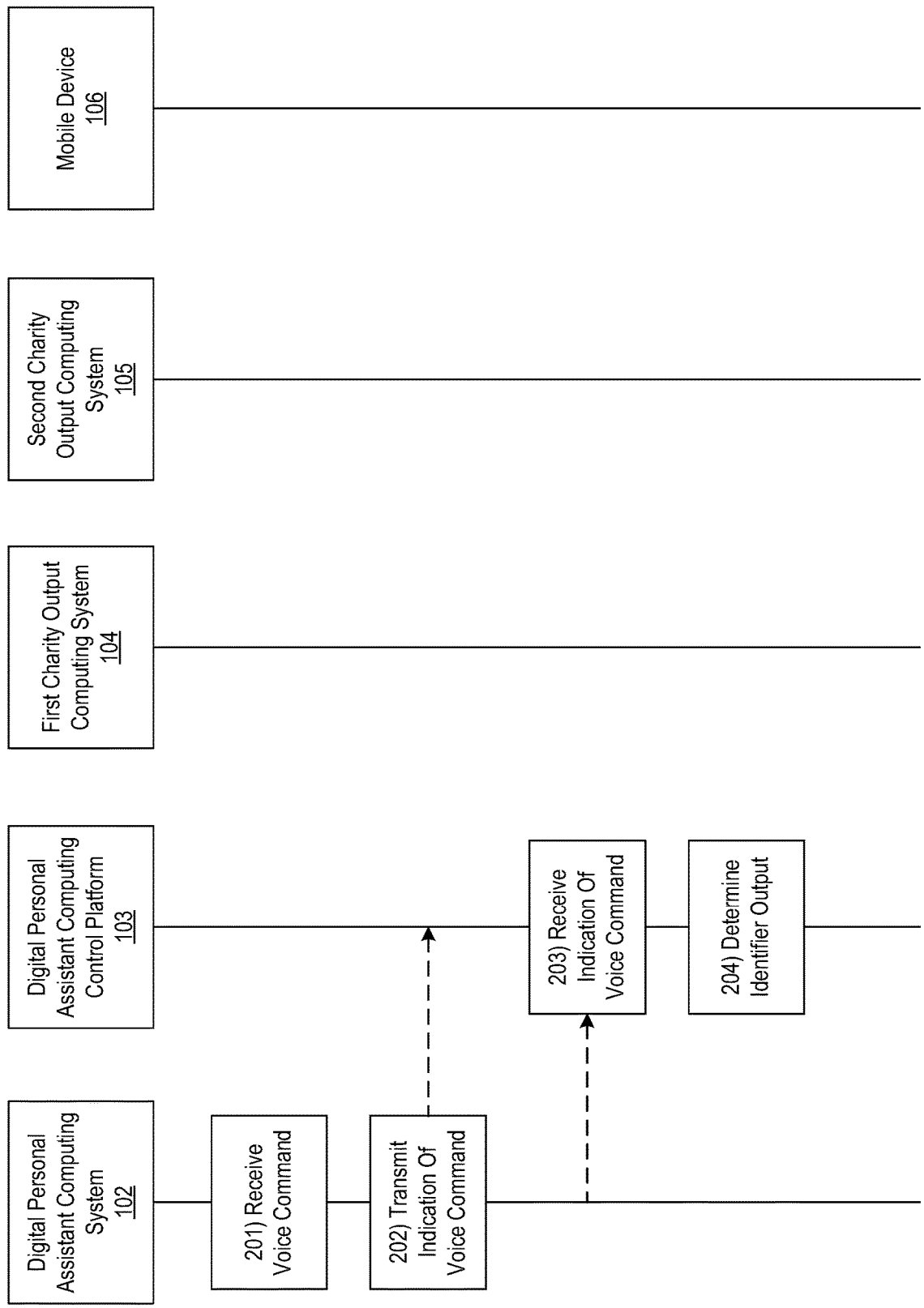

FIGS. 2A-2L depict an illustrative event sequence for determining, via machine learning analysis and algorithms, a charitable or altruistic opportunity output for presentation via a digital personal assistant in accordance with one or more example embodiments. Referring to FIG. 2A, at step 201, digital personal assistant computing system 102 may receive a voice command from, for example, a user associated with the digital personal assistant computing system 102. The voice command may be, for example, a request to determine a charity or altruistic opportunity such as one of a donation opportunity, a charity event, a random act of kindness, a volunteer opportunity and the like. For example, the voice command may contain language such as "donation," "donation opportunity," "charity," "charity event," "random act of kindness idea," "random act of kindness," "random act," "random," "random idea," "volunteer," and the like. In some examples, the digital personal assistant computing system 102 may receive the voice command in response to a request output from the digital personal assistant computing system 102. For example, if the digital personal assistant computing system determines that a voice command has not been received within a predetermined period of time, the digital personal assistant computing system 102 may output, without receiving a voice command from a user, "I'll tell you easy ways to give back today. Do you want to donate items, go to an event, or do a random act of kindness?"

At step 202, digital personal assistant computing system 102 may establish a connection to digital personal assistant computing control platform 103. For example, digital personal assistant computing system 102 may establish a first wireless data connection to digital personal assistant computing control platform to link the digital personal assistant computing system 102 to the digital personal assistant computing control platform 103. While the first wireless data connection is established, the digital personal assistance computing system 102 may transmit, to digital personal assistant computing control platform 103, an indication of the voice command.

At step 203, while the first wireless data connection is established, the digital personal assistant computing control platform 103 may receive, from the digital personal assistant computing system 102 and via the first wireless data connection, the indication of the voice command.

At step 204, the digital personal assistant computing control platform 103 may determine, based on the indication of the voice command received in step 203, an identifier output identifying the user associated with the voice command. For example, the digital personal assistant computing control platform may analyze, via machine learning algorithms and analysis, the indication of the voice command and may compare the voice command to previously received commands to determine the user. For example, the digital personal assistant computing control platform 103 may collect audio sensor data from multiple users associated with the digital personal assistant computing system 102. Based on the audio sensor data, a machine learning engine of the digital personal assistant computing control platform 103 may determine or generate one or more machine learning datasets linking the audio sensor data to various users. After determining that the audio sensor data is related to a particular user, the digital personal assistant computing control platform 103 may also perform natural language understanding on the audio sensor data to determine source data such as intentions and interests associated with the audio sensor data. The digital personal assistant computing control platform 103 may maintain the machine learning engine which may consist of machine learning datasets including the source data, the audio data, and the correlation between the source data and the audio data. Then, when new audio data is received, the digital personal assistant computing control platform 103 may determine, via a comparison of the audio data to the machine learning datasets, the user associated with the audio data, and may determine source data associated with that user. For example, the digital personal assistant computing control platform 103 may determine that a correlation between the new audio data and the audio data stored in the machine learning datasets exceeds a predetermined threshold. For example, the digital personal assistant computing control platform 103 may implement at least one of decision tree learning, association rule learning, artificial neural networks, deep learning, inductive logic programming, support vector machines, clustering, Bayesian networks, reinforcement learning, representation learning, similarity and metric learning, sparse dictionary learning, genetic algorithms, rule based machine learning, regression, and the like. This may allow the digital personal assistant computing control platform 103 to make predictions as to various outputs that the user may be interested in.

Figure 2B:
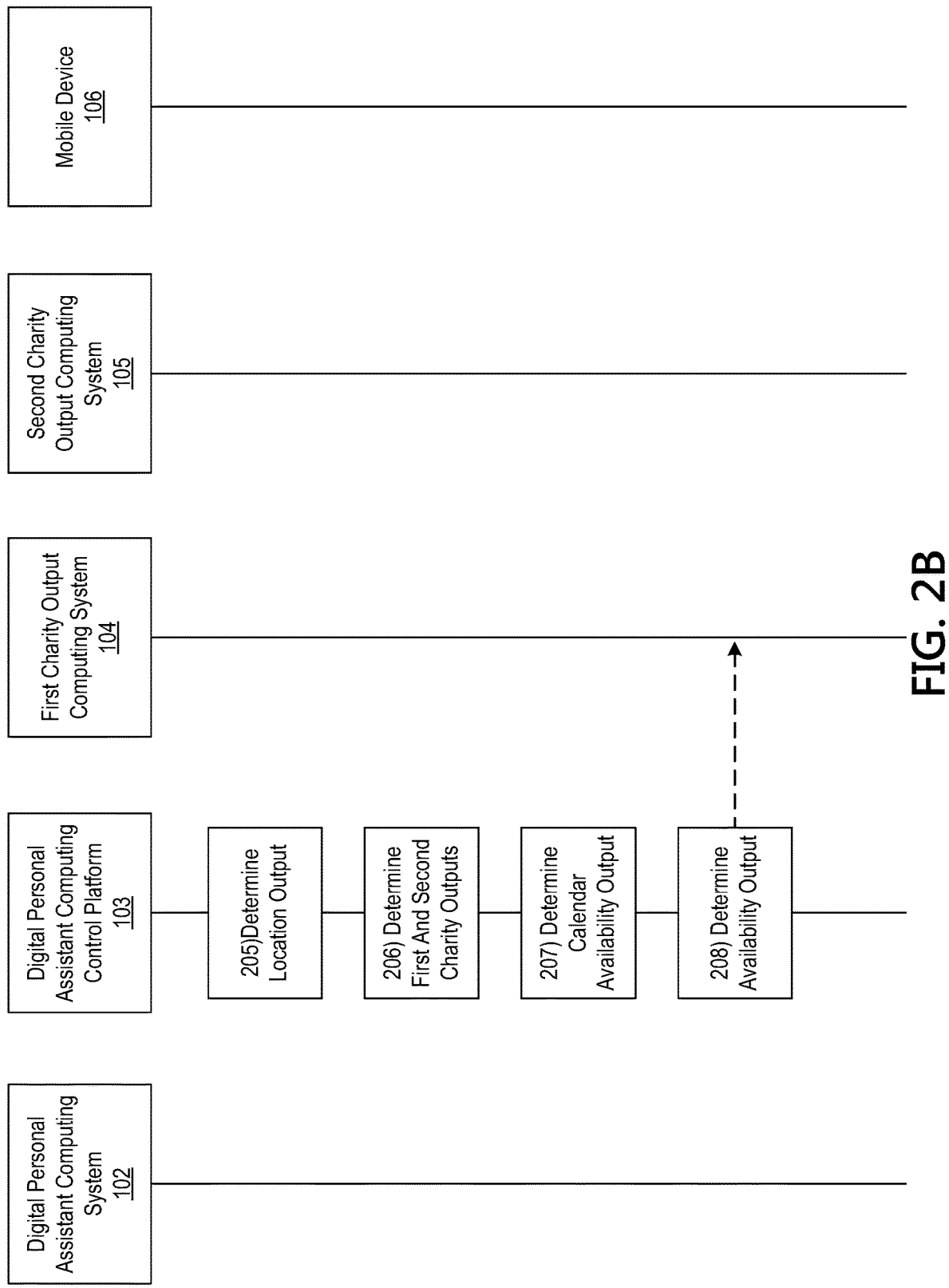

Referring to FIG. 2B, at step 205, the digital personal assistant computing control platform 103 may determine a location output. For example, the location output may indicate a geographic location associated with the digital personal assistant computing system 102. In some examples, digital personal assistant computing control platform 103 may determine the geographic location using metadata, such as an address or zip code, provided by the digital personal assistant computing system 102. In some examples, the digital personal assistant computing system 102 may determine that no voice command has been received within a predetermined period of time, and may skip steps 201-204. For example, rather than having received a request for a charity opportunity, the digital personal assistant computing platform may determine potential opportunities without receiving a user request. As an example, the digital personal assistant computing control platform 103 may determine a daily flash briefing for a user. The flash briefing may indicate a different random act of kindness to be performed that day. Additionally or alternatively, the flash briefing may include local donation opportunities and/or opportunities to volunteer one's time. This may help to integrate charity into a user's daily life. The digital personal assistant computing control platform 103 may determine, via machine learning algorithms and analysis, what to include in the flash briefing. The digital personal assistant computing control platform 103 may cause output of the flash briefing based on receiving an indication that the user has requested the flash briefing (user says "Please give me my flash briefing," etc.), based on determining that a voice command has not been received within a predetermined period of time (no request for a charity opportunity within twenty four hours), along with a morning alarm (gives flash briefing as part of a morning run down along with local weather, news, and/or safety notifications when the user wakes up), or at any other predetermined time.

At step 206, digital personal assistant computing control platform 103 may determine, based on the location output determined at step 205, one or more charity outputs such as a first charity output and a second charity output. The one or more charity outputs may comprise organizations offering charity or altruistic opportunities within a predetermined distance of the user. In one instance, the digital personal assistant computing control platform 103 may access a database of random acts of kindness within a predetermined distance that a user may be capable of performing. In additional instances, the digital personal assistant computing control platform 103 may determine, based on information from an application programming interface (API) (such as social media sites, and the like) local donation centers organizations. For example, the digital personal assistant computing control platform 103 may determine that a donation center for donating new and used goods is ten minutes away. The digital personal assistant computing control platform 103 may also use machine learning analysis and algorithms to determine the one or more charity or altruistic outputs. For example, although there is a donation center ten minutes away, the user may have turned down the past five charitable or altruistic opportunities there, and thus the digital personal assistance computing control platform 103 may determine that a charity output should not be generated for the donation center. In additional instances, the digital personal assistant computing control platform 103 may determine charity or altruistic outputs based on an API, and may cause transmission, to mobile device 106 of a short message service (SMS) notifications of the local charity events. In some examples, a user may specify a target recipient of the charity or altruistic output. For example, the user may indicate that they would like to help one or more of animals, children, or low income families. If the user does specify the target recipient, the digital personal assistant computing control platform 103 may determine the one or more charity outputs based, at least in part, on the target recipient.

At step 207, the digital personal assistant computing control platform 103 may determine a calendar availability output. The calendar availability output may indicate availability of a user based on a stored calendar. For example, the digital personal assistant computing control platform 103 may determine that the user is not free on a particular day, but that the user is free the following day.

At step 208, the digital personal assistant computing control platform 103 may determine an availability output. For example, in addition to determining the user's availability based on a stored calendar, the digital personal assistant computing control platform 103 may determine the user's availability based on additional data such as the location output determined at step 205 or a daily activity not shown on the stored calendar (user works out between 5-6 PM, user drops a child off at school at 8 AM, and the like). In some instances, the digital personal assistant computing control platform 103 may determine time-based contextual opportunities (using VolunteerMatch, JUSTSERVE™, Catchafire, and the like). For example, the digital personal assistant computing control platform 103 may determine that a user is currently driving a child to school. Using machine learning algorithms and analysis, the digital personal assistant computing control platform 103 may determine that the user will be at the school in ten minutes, and will not need to pick the child up again for several hours. As a result, the digital personal assistant computing control platform 103 may determine that the user is available for charity opportunities starting in ten minutes and for the next several hours.

Figure 2C:
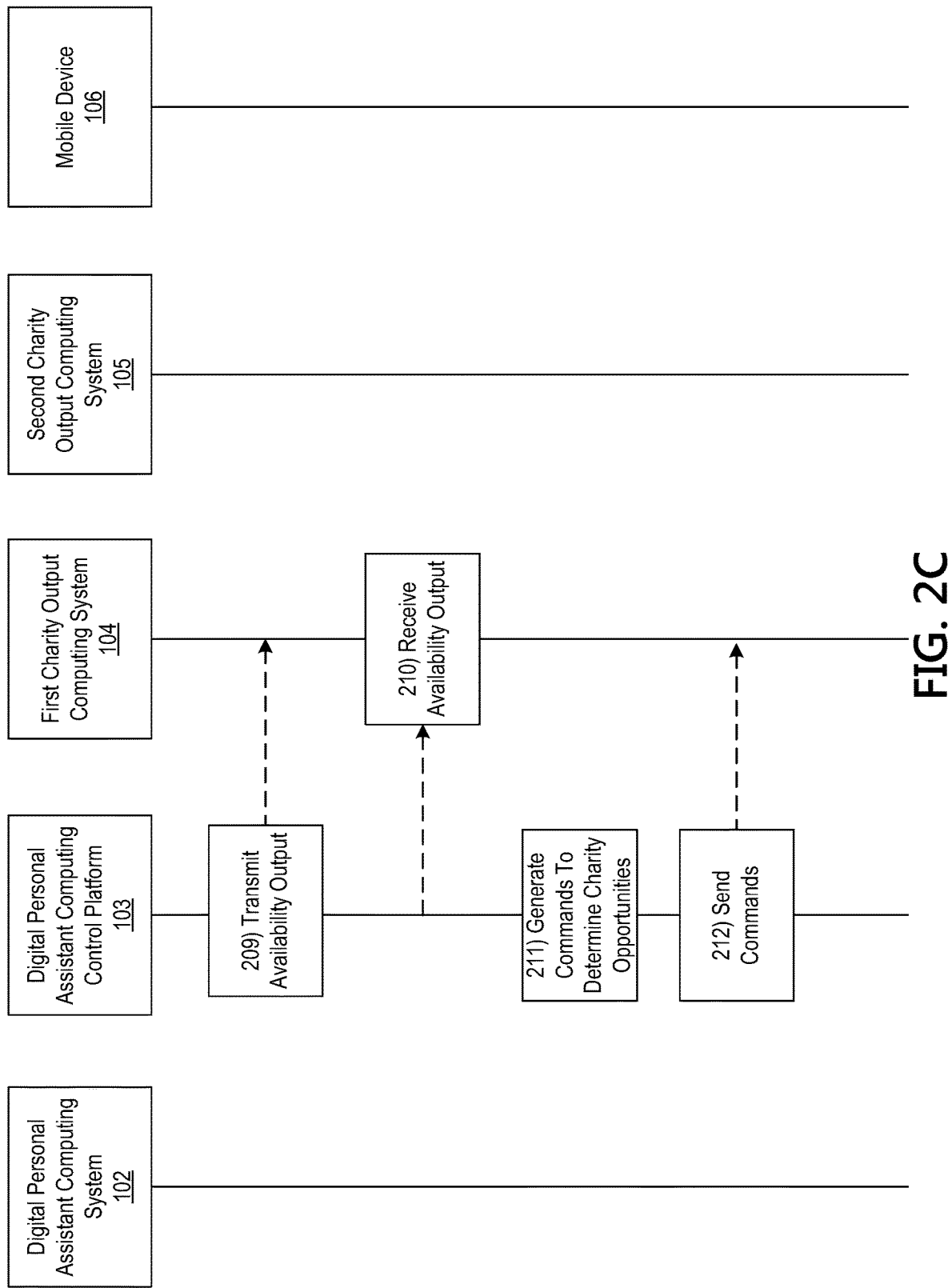

Referring to FIG. 2C, at step 209, the digital personal assistant computing control platform 103 may transmit the availability output, determined at step 208, to the first charity output computing system 104. For example, the digital personal assistant computing control platform 103 may establish a connection to first charity output computing system 104. For example, the digital personal assistant computing control platform 103 may establish a second wireless data connection to the first charity output computing system 104 to link the digital personal assistant computing control platform 103 to the first charity output computing system 104. While the second wireless data connection is established, the digital personal assistant computing control platform 103 may transmit, to the first charity output computing system 104, the availability output.

At step 210, the first charity output computing system 104 may receive, from the digital personal assistant computing control platform 103 and via the second wireless data connection, the availability output.

At step 211, the digital personal assistant computing control platform may generate one or more commands to determine, based on the availability output, charitable or altruistic opportunity outputs. For example, charitable or altruistic opportunity outputs may comprise charity opportunities with a particular organization. Different organizations may be associated with different charity output computing systems.

At step 212, digital personal assistant computing control platform 103 may transmit, after generating the one or more commands to determine charitable or altruistic opportunity outputs at step 211, the one or more commands to determine charitable or altruistic opportunity outputs. For example, the digital personal assistant computing control platform 103 may transmit, to the first charity output computing system 104 and while the second wireless data connection is established, the one or more commands. The digital personal assistant computing control platform 103 may transmit the one or more commands via the second wireless data connection.

Figure 2D:
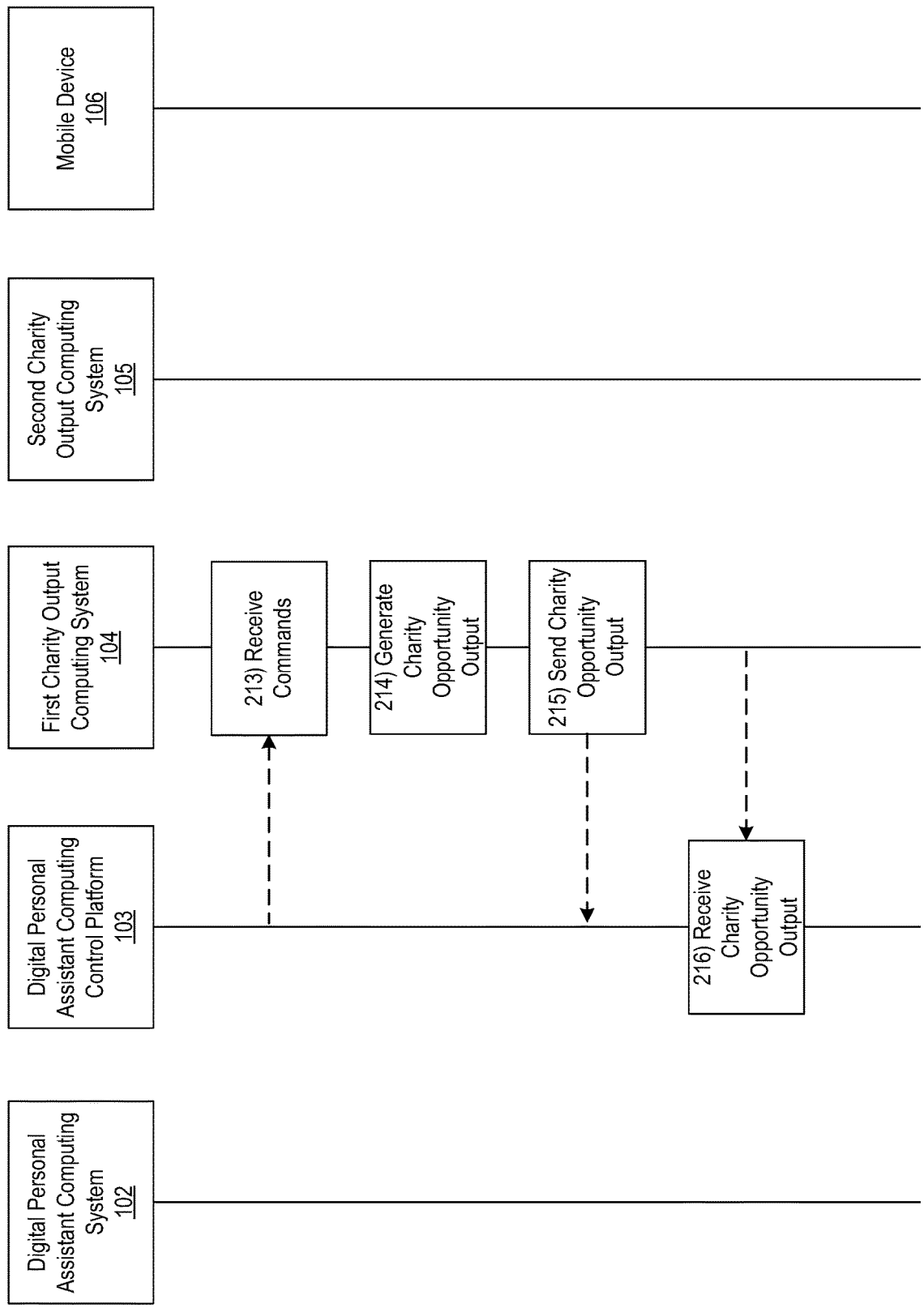

Referring to FIG. 2D, at step 213, the first charity output computing system 104 may receive, from the digital personal assistant computing control platform 103 and via the second wireless data connection, the one or more commands to determine charitable or altruistic opportunity outputs.

At step 214, the first charity output computing system 104 may generate, in response from the one or more commands received at step 213, one or more charitable or altruistic opportunity outputs. For example, the charitable or altruistic opportunity outputs may indicate charity events for an organization associated with the first charity output computing system 104. For example, if the first charity output computing system 104 is associated with a food pantry, the one or more charitable or altruistic opportunity outputs may comprise charity opportunities associated with the food pantry (drop off canned goods, volunteer to check inventory, make a donation, and the like). Additional charity opportunities may comprise, for example, opportunities to volunteer time at a local non-profit (giving blood at a local blood bank, donating clothes to a local donation center, and the like), opportunities to donate money to a local non-profit (going to a fundraiser, attending a silent auction benefit, and the like), and random acts of kindness (e.g., bringing in breakfast for coworkers, dropping off a thank you note at a fire department, leaving quarters at a laundromat, and the like).

At step 215, the first charity output computing system 104 may transmit, to the digital personal assistant computing control platform 103 and via the second wireless data connection, the one or more charitable or altruistic opportunity outputs.

At step 216, the digital personal assistant computing control platform 103 may receive, from the first charity output computing system and via the second wireless data connection, the one or more charitable or altruistic opportunity outputs.

Figure 2E:
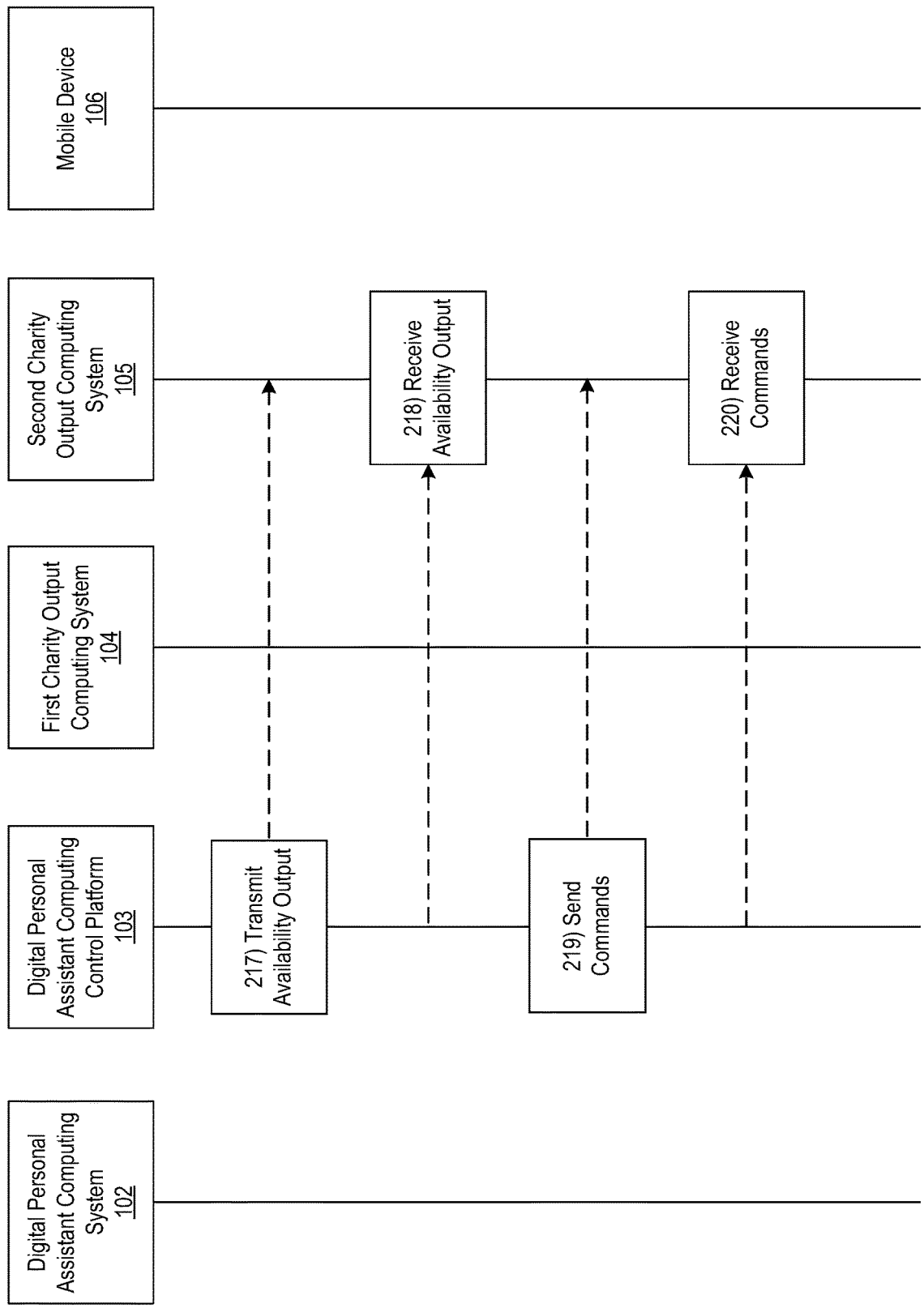

Referring to FIG. 2E, at step 217, the digital personal assistant computing control platform 103 may transmit the availability output, determined at step 208, to the second charity output computing system 105. For example, the digital personal assistant computing control platform 103 may establish a connection to second charity output computing system 105. For example, the digital personal assistant computing control platform 103 may establish a third wireless data connection to the second charity output computing system 105 to link the digital personal assistant computing control platform 103 to the second charity output computing system 105. While the third wireless data connection is established, the digital personal assistant computing control platform 103 may transmit, to the second charity output computing system 105, the availability output. Actions performed at step 217 may be similar to those performed at step 209.

At step 218, the second charity output computing system 105 may receive, from the digital personal assistant computing control platform 103 and via the third wireless data connection, the availability output. Actions performed at step 218 may be similar to those performed at step 210.

At step 219, the digital personal assistant computing control platform 103 may transmit, to the second charity output computing system 105 and via the third wireless data connection, the one or more commands, generated at step 211, to generate one or more charitable or altruistic opportunity outputs. Actions performed at step 219 may be similar to those performed at step 212.

At step 220, the second charity output computing system 105 may receive, from the digital personal assistant computing control platform 103 and via the third wireless data connection, the one or more commands to generate one or more charitable or altruistic opportunity outputs. Actions performed at step 220 may be similar to those performed at step 213.

Referring to FIG. 2F, at step 221, the second charity output computing system 105 may generate one or more charitable or altruistic opportunity outputs. Actions performed at step 221 may be similar to those performed at step 214.

At step 222, the second charity output computing system 105 may transmit, to the digital personal assistant computing control platform 103 and via the third wireless data connection, the one or more charitable or altruistic opportunity outputs generated at step 221. Actions performed at step 222 may be similar to those described performed at step 215.

At step 223, the digital personal assistant computing control platform 103 may receive, from the second charity output computing system 105 via the third wireless data connection, the one or more charitable or altruistic opportunity outputs. Actions performed at step 223 may be similar to those performed at step 216.

At step 224, the digital personal assistant computing control platform 103 may generate one or more commands directing the digital personal assistant computing system 102 to output the charitable or altruistic opportunity outputs. For example, the digital personal assistant computing system 102 may comprise a voice recognition personal assistant computing system, such as AMAZON ALEXA™ or GOOGLE HOME™. The one or more commands may direct the digital personal assistant computing system 102 to cause an audio output of the one or more charitable or altruistic opportunity outputs received by the digital personal assistant computing control platform 103 at steps 216 and 223 respectively. Although digital personal assistant computing control platform 103 is illustrated as receiving charitable or altruistic opportunity outputs from first charity output computing system 104 and second charity output computing system 105, and subsequently generating commands for the digital personal assistant computing system 102 to output these charitable or altruistic opportunity outputs, it should be understood that the digital personal assistant computing control platform 103 may request and receive charitable or altruistic opportunity outputs from any number of charity output computing systems and may subsequently generate commands for the digital personal assistant computing system 102 to output these charitable or altruistic opportunity outputs.

Referring to FIG. 2G, at step 225, the digital personal assistant computing control platform may transmit, to the digital personal assistant computing system 102 and via the first wireless data connection, the one or more commands generated at step 224.

At step 226, the digital personal assistant computing control platform 103 may receive, from the digital personal assistant computing control platform 103 and via the first wireless data connection, the one or more commands transmitted at step 225.

At step 227, the digital personal assistant computing system 102 may cause output of the charitable or altruistic opportunity outputs. For example, the digital personal assistant computing system 102 may cause an audio output such as "drop off some canned goods at the local food panty" or "give blood at the local blood bank." In some instances, the digital personal assistant computing system 102 may present the charitable or altruistic opportunity outputs in an uninterrupted sequence (continuously outputs a list until the user responds). In other instances, the digital personal assistant computing system 102 may output a first charitable or altruistic opportunity output and wait for a user command before outputting a second charitable or altruistic opportunity output. For example, the digital personal assistant computing system 102 may output the first charitable or altruistic opportunity output and that output "want to hear another?" or "want more?" In other examples, the digital personal assistant computing system 102 may cause output of an SMS notification received from the digital personal assistant computing control platform 103.

At step 228, the digital personal assistant computing system 102 may receive, in response to the output of the charitable or altruistic opportunity outputs at step 227, a voice command. In these examples, if the digital personal assistant computing system 102 receives a voice command such as "yes," "another," and/or "more," the digital personal assistant computing system 102 may output "Here's another idea. [idea]. Want more?" If the digital personal assistant computing system 102 receives a voice command such as "no," "end," and/or "stop," the digital personal assistant computing system 102 may output "Have a great day!"

Figure 2H:
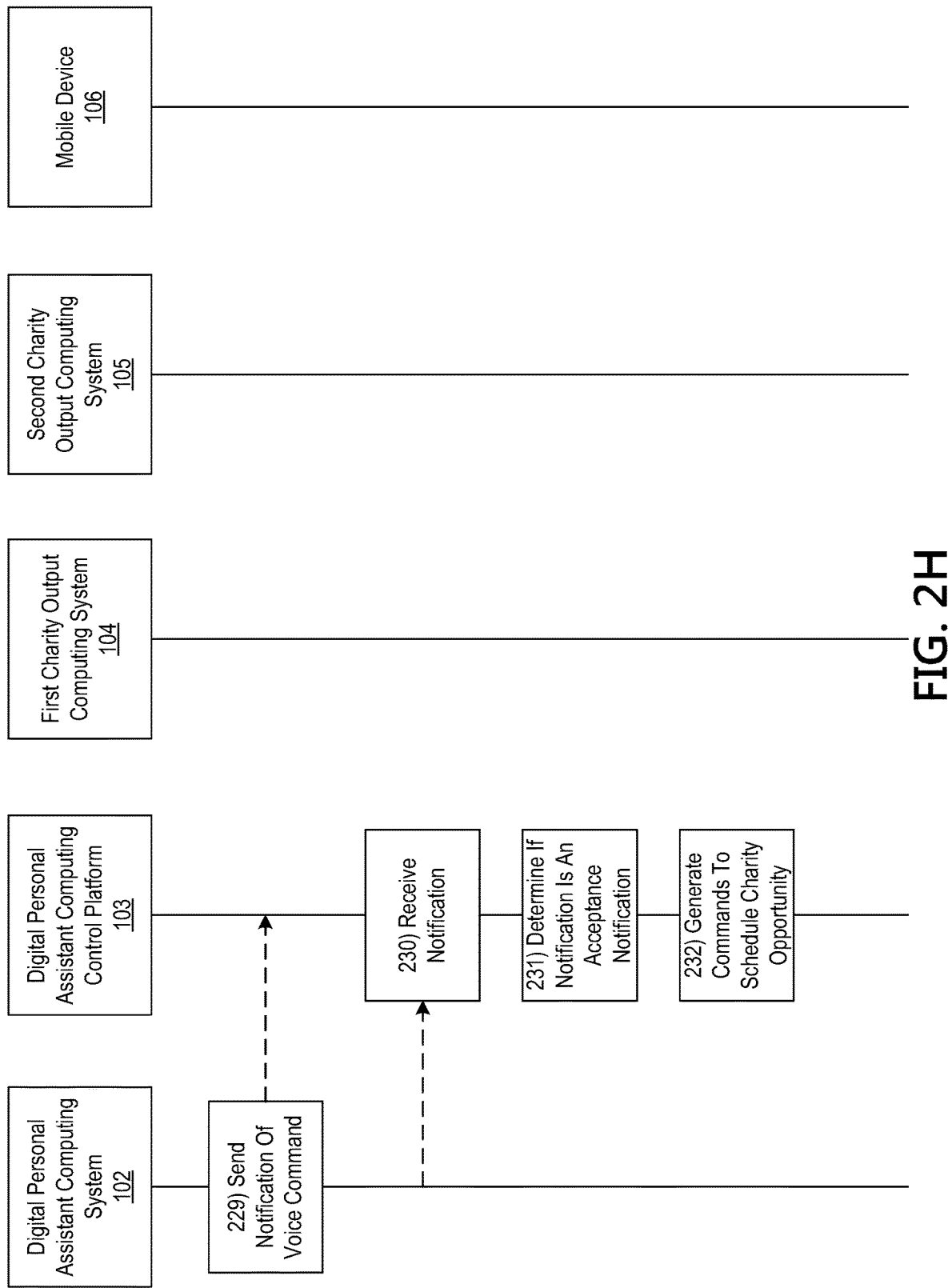

Referring to FIG. 2H, at step 229, the digital personal assistant computing system 102 may generate a notification of the voice command received at step 228 and may transmit, via the first wireless data connection and to the digital personal assistant computing control platform 103, the notification.

At step 230 the digital personal assistant computing control platform 103 may receive, from the digital personal assistant computing system 102 and via the first wireless data connection, the notification of the voice command.

At step 231, the digital personal assistant computing control platform may perform natural language understanding (NLU) processing of the notification and may determine whether the notification indicates acceptance of the one or more charitable or altruistic opportunity outputs, or if the notification indicates refusal of the one or more charitable or altruistic opportunity outputs. For example, if the digital personal assistant computing control platform 103 determines that the voice command comprises "Yes, I'd like to attend the fundraiser tonight," the digital personal assistant computing control platform 103 may determine that the notification indicates acceptance. In another example, if the digital personal assistant computing control platform 103 determines that the voice command comprises "No, I don't want to drop off a thank you note at the fire department," the digital personal assistant computing control platform 103 may determine that the notification indicates refusal. In some examples, the digital personal assistant computing control platform 103 may determine that a notification was not received within a predetermined period of time since the commands to output the charitable or altruistic opportunity outputs were sent. In these examples, the digital personal assistant computing control platform 103 may determine that the user does not want to participate in the suggested charity opportunities (e.g., may interpret the lack of response as refusal). If the digital personal assistant computing control platform 103 determines that a user does not want to participate in the suggested charity opportunity, the digital personal assistant computing control platform 103 may return to step 211 and generate commands for charity output computing systems (e.g., first charity output computing system 104, second charity output computing system 105, and the like) to determine more charity opportunities. If the digital personal assistant computing control platform 103 determines that a user does want to participate in the suggested charity opportunity (e.g., receives an indication of acceptance), the digital personal assistant computing control platform may proceed to step 232.

At step 232, the digital personal assistant computing control platform 103 may generate one or more commands to schedule the charity opportunity confirmed via the notification received at step 230. In some examples, the digital personal assistant computing control platform 103 may determine that the charity opportunity may be performed without scheduling. For example, the charity opportunity may be bringing in breakfast to coworkers, dropping off a thank you note at a local fire department, leaving quarters in a laundromat, making a monetary donation (using one or more online payment systems, mobile payment applications, and the like), and the like. In these examples, the digital personal assistant computing control platform 103 may proceed to step 239. If the digital personal assistant computing control platform 103 determines that the charity opportunity should be scheduled, it may proceed to step 233.

Referring to FIG. 2I, at step 233, the digital personal assistant computing control platform 103 may transmit, via the second wireless data connection and to the charity output computing system associated with the charity opportunity (e.g. first charity output computing system 104, and the like), the one or more commands to schedule the charity opportunity.

At step 234, the first charity output computing system 104 may receive, from the digital personal assistant computing control platform 103 and via the second wireless data connection, the one or more commands to schedule the charity opportunity transmitted at step 233.

At step 235, the first charity output computing system 104 may schedule the charity opportunity. For example, the first charity output computing system 104 may add the user to a list of participants. In some examples, the first charity output computing system 104 may assign the user to a time slot associated with the charity opportunity. This may allow the first charity output computing system 104 to manage participants across various charity opportunities.

At step 236, the first charity output computing system 104 may generate a charity confirmation output. For example, the charity confirmation output may comprise a notification that the user is registered for the charity opportunity.

Figure 2J:
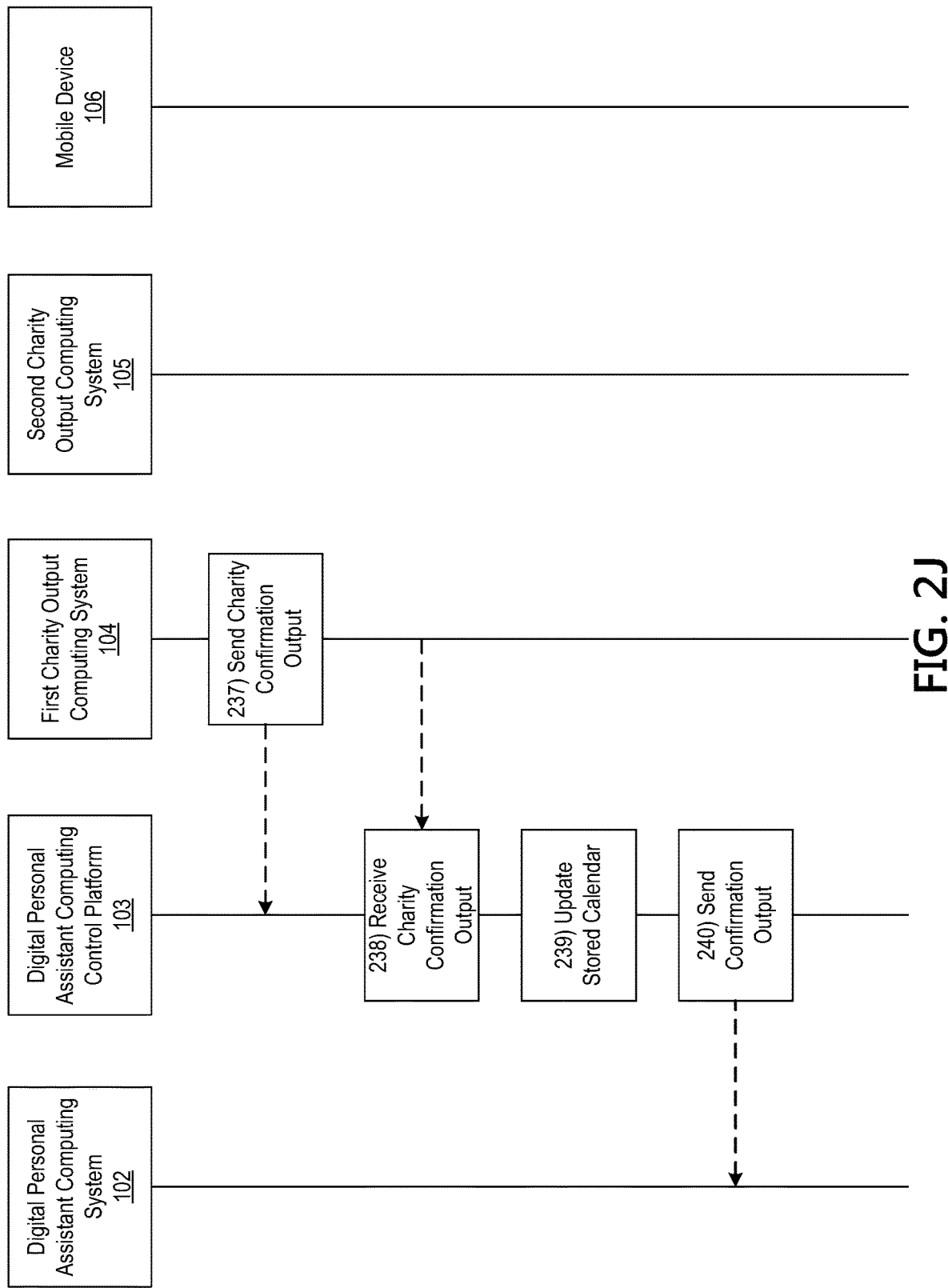

Referring to FIG. 2J, at step 237, the first charity output computing system 104 may transmit, to the digital personal assistant computing control platform 103 and via the second wireless data connection, the charity confirmation output generated at step 236.

At step 238 the digital personal assistant computing control platform 103 may receive, via the second wireless data connection and from the first charity output computing system 104, the charity confirmation output.

At step 239, the digital personal assistant computing control platform 103 may update a stored calendar. If the digital personal assistant computing control platform 103 received a charity confirmation output, the updating may be in response to receiving the charity confirmation output. For example, the digital personal assistant computing control platform 103 may generate an event from 6-8 PM on Mar. 1, 2018 titled "Silent Auction Benefitting Local High School," and may add this event to a stored calendar associated with the user.

At step 240, the digital personal assistant computing control platform 103 may also send, via the first wireless data connection and to the digital personal assistant computing system 102, the charity confirmation output received at step 238. In some examples, if a charity confirmation output was not received by the digital personal assistant computing control platform 103 at step 238, the digital personal assistant computing control platform 103 may proceed to step 246. If a charity confirmation output was received, the digital personal assistant computing control platform 103 may proceed to step 241.

Referring to FIG. 2K, at step 241, the digital personal assistant computing system 102 may receive, from the digital personal assistant computing control platform 103 and via the first wireless data connection, the charity confirmation output transmitted at step 240.

At step 242, the digital personal assistant computing control platform 103 may generate one or more commands directing the digital personal assistant computing system 102 to cause output of the charity confirmation output, such as an audio output.

At step 243, the digital personal assistant computing control platform 103 may transmit, to the digital personal assistant computing system 102 and via the first wireless data connection, the one or more commands directing the digital personal assistant computing system 102 to cause output of the charity confirmation output.

At step 244, the digital personal assistant computing system 102 may receive, via the first wireless data connection and from the digital personal assistant computing control platform 103, the commands transmitted at step 243.

Figure 2L:
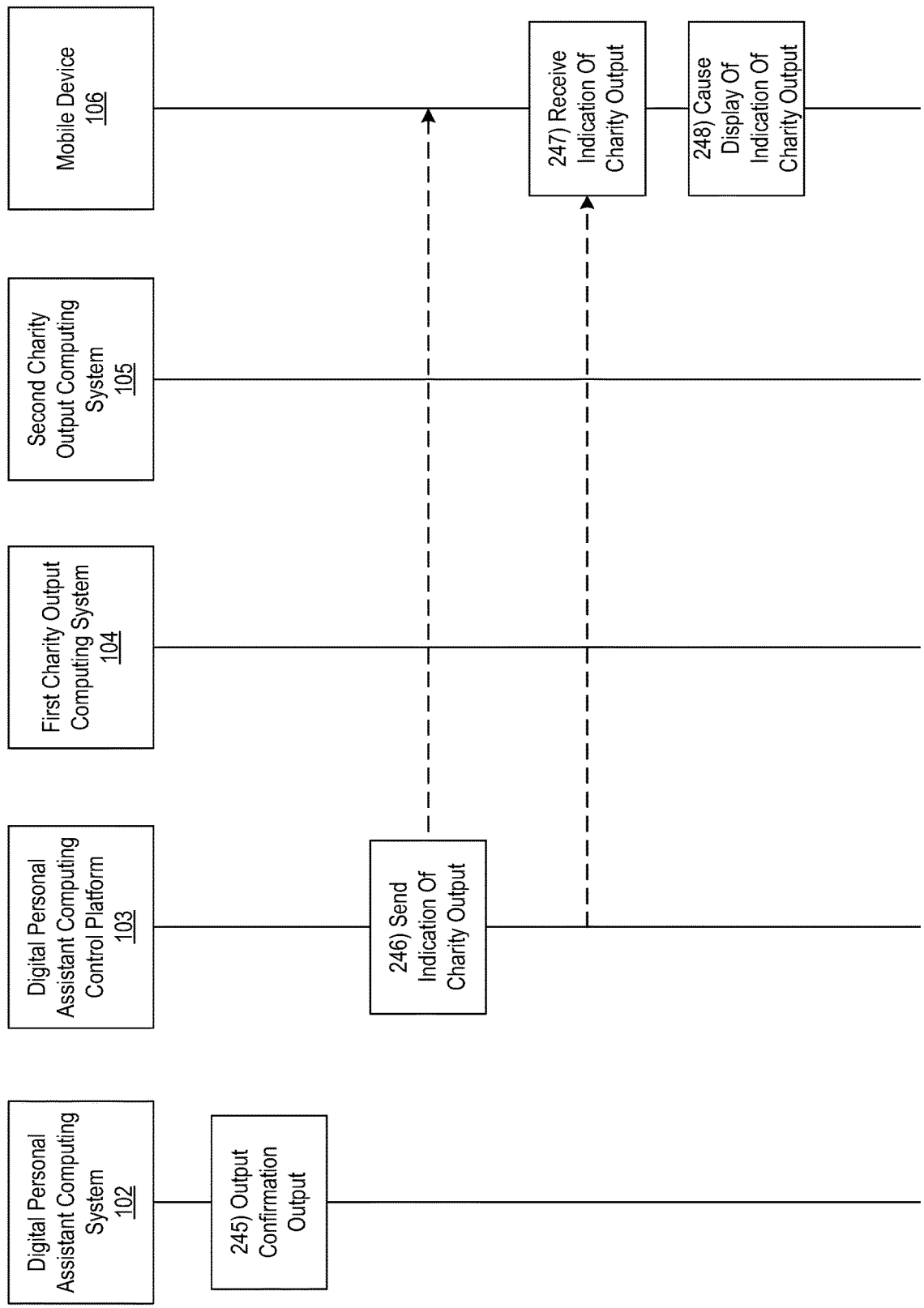

Referring to FIG. 2L, at step 245, the digital personal assistant computing system 102 may cause output of the charity confirmation output. For example, the digital personal assistant computing system 102 may cause an audio output of "You are now scheduled for the yoga fundraiser tonight."

At step 246, the digital personal assistant computing control platform 103 may establish a fourth wireless data connection with mobile device 106. The digital personal assistant computing control platform 103 may generate an indication of the charity output (which may, e.g., include user interface templates, user interface layouts, user interface content data, and/or other information). In some instances, the indication may comprise updated calendar user interface information. In other instances, the indication may comprise a link to donate money. In additional instances, the indication may comprise a link for directions to the charity event. The digital personal assistant computing control platform 103 may send, via the fourth wireless data connection and to mobile device 106, the indication of charity output. The digital personal assistant computing control platform 103 may also generate one or more commands directing the mobile device 106 to cause display of the indication of the charity output, and may transmit, to the mobile device 106, via the fourth wireless data connection, and along with the indication of charity output, the one or more commands.

At step 247, the mobile device 106 may receive, from the digital personal assistant computing control platform 103 and via the fourth wireless data connection, the charity output indication and the one or more commands transmitted at step 246. For example, the mobile device 106 may receive charity output interface information (which may, e.g., include user interface templates, user interface layouts, user interface content data, and/or other information).

Figure 3:
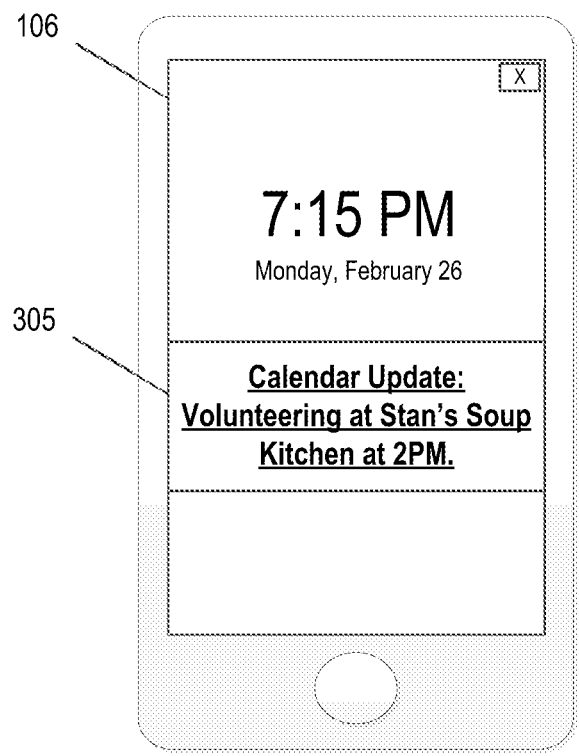
FIGS. 3, 4, and 5 depict example graphical user interfaces for determining charitable or altruistic outputs in accordance with one or more example embodiments.
Figure 4:
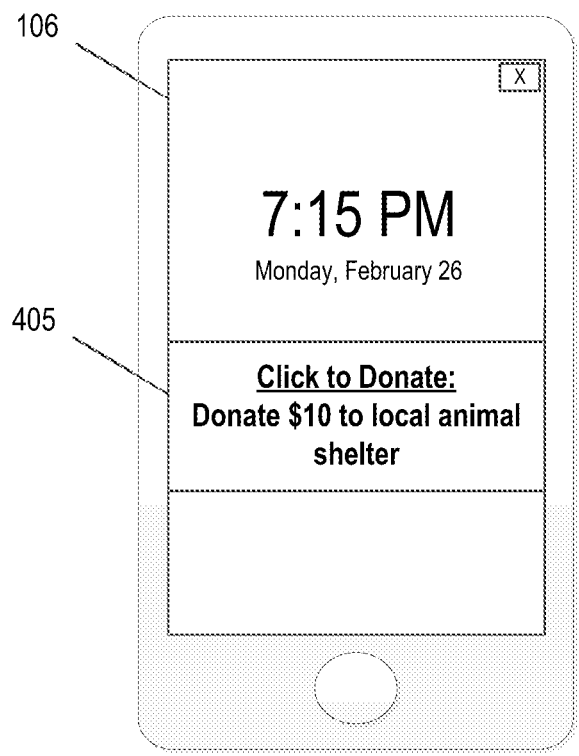
Figure 5:
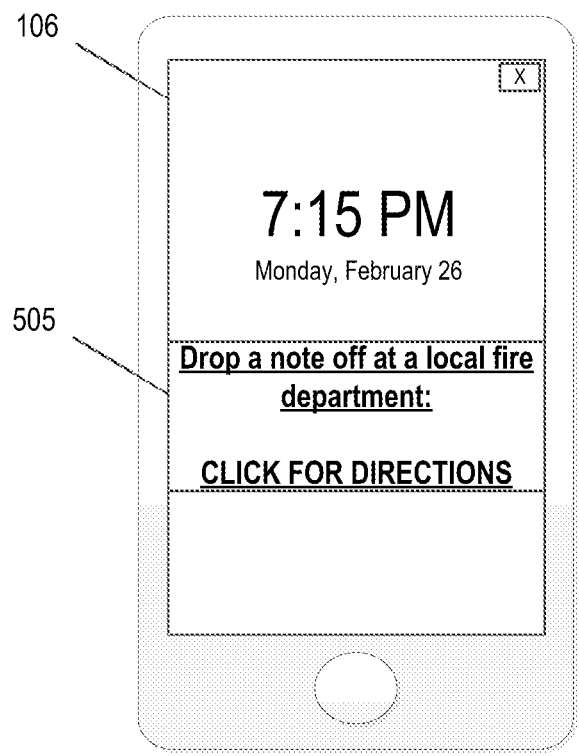

At step 248, the mobile device 106 may cause display, in response to the one or more commands received at step 247, of the charity output indication (e.g. based on the information received from digital personal assistant computing control platform 103). In some instances, in causing display of the one or more mobile charity user interfaces based on the charity output user interface information received from the digital personal assistant computing control platform 103, mobile device 106 may display and/or otherwise present a graphical user interface similar to graphical user interface 305, which is illustrated in FIG. 3. As seen in FIG. 3, graphical user interface 305 may include a calendar update notification and/or other user-selectable options and/or content. In this instance, features such as calendar integration may be used to sync the charity event to the user's calendar. In other instances, the graphical user interface may be similar to graphical user interface 405, which is illustrated in FIG. 4. As seen in FIG. 4, graphical user interface 405 may include a link to make a monetary donation and/or other user-selectable options and/or content. In yet additional instances, the graphical user interface may be similar to graphical user interface 505, which is illustrated in FIG. 5. As seen in FIG. 5, graphical user interface 505 may include a link to access directions to a location of the charity opportunity.

Although steps 201-248 describe a method for determining a charity output, the digital personal assistant computing control platform 103 may determine any number of different outputs other than charity outputs. For example the digital personal assistant computing control platform 103 may determine that a user needs groceries and that he or she has a one hour gap in their schedule. The digital personal assistant computing control platform 103 may cause output of a grocery output comprising the user's shopping list, nearby grocery stores, recipes, and the like. Other potential outputs that the digital personal assistant computing control platform 103 may be related to fitness, leisure, education, travel, household chores, and the like.

Figure 6:
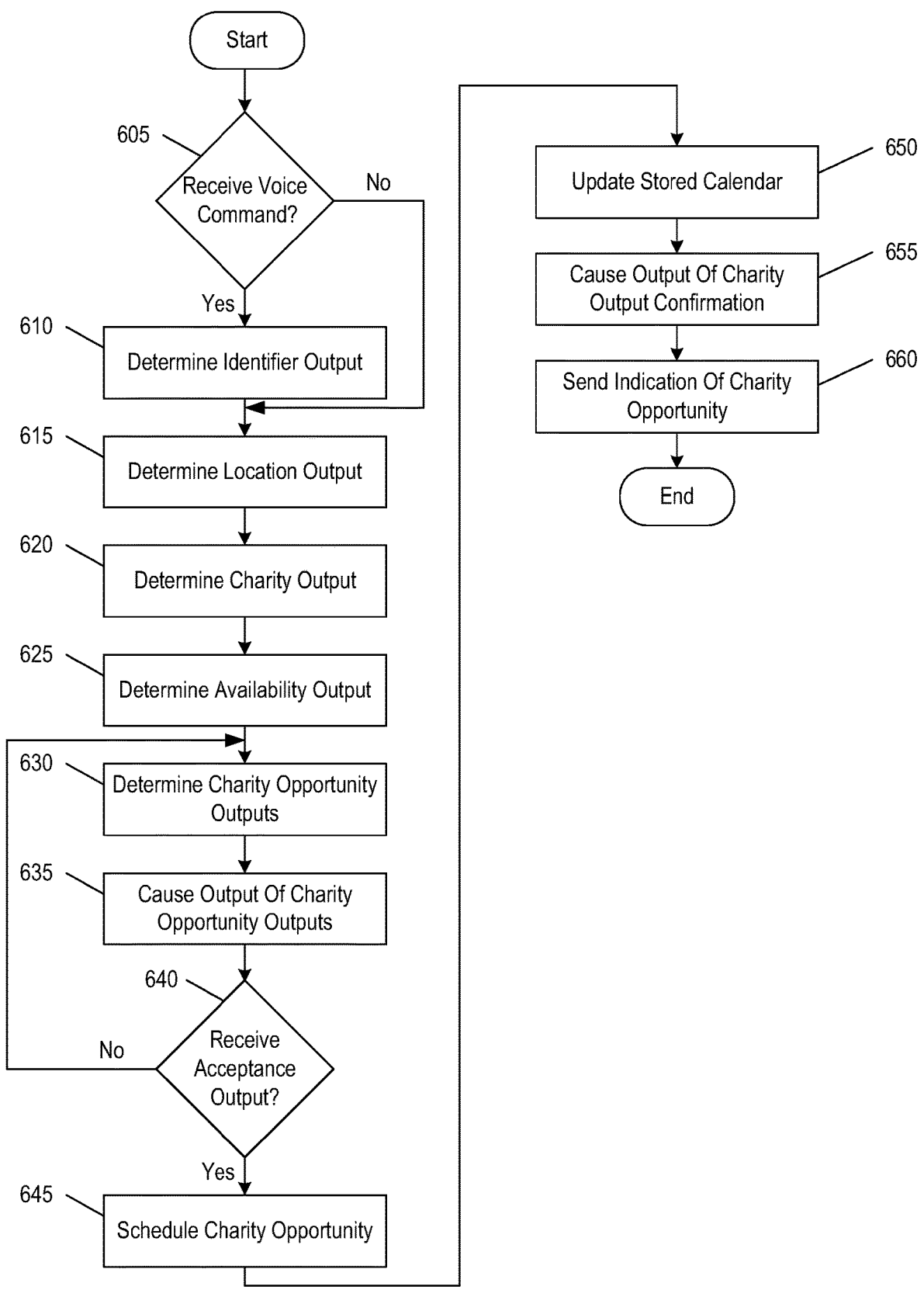
FIG. 6 depicts an illustrative method for determining charitable or altruistic outputs in accordance with one or more example embodiments.

FIG. 6 depicts an illustrative method for determining a charitable or altruistic opportunity output in accordance with one or more example embodiments. Referring to FIG. 6, at step 605, a computing device having at least one processor, a communication interface, and a memory may determine whether a voice command has been received. If a voice command has been received, the computing device may proceed to step 610. If a voice command has not been received, the computing device may proceed to step 615. At step 610, based on the voice command received at step 605, the computing device may determine an identifier output comprising an indication of a user that provided the voice command. At step 615, the computing device may determine a location output comprising an indication of a geographic location of the user. At step 620, the computing device may determine a charity output, indicating one or more organizations located within a predetermined distance of the user that may have charity opportunities. At step 625, the computing device may access a stored calendar and determine, based on the stored calendar, an availability output indicating the user's availability (e.g., based on a user being identified from the recognized voice command, a predefined setting, a location of the computing device, and the like). At step 630, the computing device may determine one or more charitable or altruistic opportunity outputs, comprising charity opportunities that fit the user's schedule. At step 635, the computing device may cause output of the charitable or altruistic opportunity outputs via an audio and/or visual output. At step 640, the computing device may determine whether an acceptance input, indicating acceptance of one of the one or more charity opportunities was accepted by the user. If an acceptance input was not received, the computing device may return to step 630 to determine additional charitable or altruistic opportunity outputs. If an acceptance input was received, the computing device may proceed to step 645. At step 645, the computing device may schedule the charity opportunity. At step 650, the computing device may update a stored calendar. At step 655, the computing device may cause output of a charity output confirmation. At step 660, the computing device may send, to a mobile device associated with the user, an indication of the charity opportunity.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A mobile device comprising:
   at least one processor;
   a communication interface communicatively coupled to the at least one processor;
   a location sensor; and
   memory storing computer-readable instructions that, when executed by the at least one processor, cause the at least one processor to:
   determine, via machine learning algorithms and based on a first voice command input, an identifier indicating a user associated with the first voice command input;
   receive an approximate location of the mobile device;
   determine, via a stored calendar, an availability output indicating availability associated with the user;
   determine, based on the identifier, the location, and the availability output, a charitable opportunity indicator identifying a charitable opportunity for the user;
   verify, with a computing device associated with the charitable opportunity and after receiving a second voice command selection indicating acceptance of the charitable opportunity, an acceptance of the charitable opportunity; and
   update the stored calendar to include at least one entry indicating the charitable opportunity.

2. The mobile device of claim 1, wherein the computer-readable instructions further cause the at least one processor to:
   display, on a display device and after updating the stored calendar, a notification of the updated stored calendar.

3. The mobile device of claim 1, wherein the computer-readable instructions further cause the at least one processor to:
   verify, with a second computing device associated with a second charitable opportunity, an acceptance of a second charitable opportunity; and
   update the stored calendar to include at least one entry indicating the second charitable opportunity.

4. The mobile device of claim 1, wherein the computer-readable instructions further cause the at least one processor to:
   generate a link to donate money based on the charitable opportunity; and
   display, on a display device, the link to donate money based on the charitable opportunity.

5. The mobile device of claim 1, wherein the computer-readable instructions further cause the at least one processor to:
   display, on a display device, a reminder notification for the charitable opportunity.

6. The mobile device of claim 1, wherein the computer-readable instructions further cause the at least one processor to:
   display, on a display device and based on the approximate location of the mobile device, a link to access directions from the approximate location of the mobile device to a location associated with the charitable opportunity.

7. The mobile device of claim 1, wherein the computer-readable instructions further cause the at least one processor to:
   update, based on the second voice command selection indicating acceptance of the charitable opportunity, at least one aspect of the machine learning algorithms.

8. The mobile device of claim 7, wherein determining the charitable opportunity indicator identifying a charitable opportunity for the user is further based on the updated machine learning algorithms.

9. The mobile device of claim 1, wherein the charitable opportunity comprises at least one of making a donation, going to an event, or performing a charitable action.

10. A method comprising:
    receiving, at a mobile device via a communication interface, a first voice command input;

determining, via machine learning algorithms and based on the first voice command input, an identifier indicating a user associated with the first voice command input;

receiving an approximate location of the mobile device;

determining, via a stored calendar of the mobile device, an availability output indicating availability associated with the user;

determining, based on the identifier, the location, and the availability output, a charitable opportunity indicator identifying a charitable opportunity for the user;

receiving a second voice command selection indicating acceptance of the charitable opportunity;

verifying, with a computing device associated with the charitable opportunity and after receiving the second voice command selection, an acceptance of the charitable opportunity; and updating the stored calendar to include at least one entry indicating the charitable opportunity.

11. The method of claim 10, further comprising:

displaying, on a display device of the mobile device and after updating the stored calendar, a notification of the updated stored calendar.

12. The method of claim 10, further comprising:

verifying, with a second computing device associated with a second charitable opportunity, an acceptance of a second charitable opportunity; and updating the stored calendar to include at least one entry indicating the second charitable opportunity.

13. The method of claim 10, further comprising:

generating a link to donate money based on the charitable opportunity; and displaying, on a display device of the mobile device, the link to donate money based on the charitable opportunity.

14. The method of claim 10, further comprising:

displaying, on a display device of the mobile device, a reminder notification for the charitable opportunity.

15. The method of claim 10, further comprising:

displaying, on a display device of the mobile device and based on the approximate location of the mobile device, a link to access directions from the approximate location of the mobile device to a location associated with the charitable opportunity.

16. The method of claim 10, further comprising:

updating, based on the second voice command selection indicating acceptance of the charitable opportunity, at least one aspect of the machine learning algorithms.

17. A non-transitory computer-readable storage medium having computer-executable program instructions stored thereon that when executed by a processor, cause a computing device to perform:

receiving, at a mobile device via a communication interface, a first voice command input;

determining, via machine learning algorithms and based on the first voice command input, an identifier indicating a user associated with the first voice command input;

receiving an approximate location of the mobile device;

determining, via a stored calendar of the mobile device, an availability output indicating availability associated with the user;

determining, based on the identifier, the location, and the availability output, a charitable opportunity indicator identifying a charitable opportunity for the user;

receiving a second voice command selection indicating acceptance of the charitable opportunity;

verifying, with a computing device associated with the charitable opportunity and after receiving the second voice command selection, an acceptance of the charitable opportunity; and updating the stored calendar to include at least one entry indicating the charitable opportunity.

18. The non-transitory computer-readable storage medium of claim 17, further comprising computer-executable instructions that, when executed by the processor, cause the computing device to perform:

verifying, with a second computing device associated with a second charitable opportunity, an acceptance of a second charitable opportunity; and updating the stored calendar to include at least one entry indicating the second charitable opportunity.

19. The non-transitory computer-readable storage medium of claim 17, further comprising computer-executable instructions that, when executed by the processor, cause the computing device to perform:

updating, based on the second voice command selection indicating acceptance of the charitable opportunity, at least one aspect of the machine learning algorithms.

20. The non-transitory computer-readable storage medium of claim 17, further comprising computer-executable instructions that, when executed by the processor, cause the computing device to perform:

generating a link to donate money based on the charitable opportunity; and displaying, on a display device of the mobile device, the link to donate money based on the charitable opportunity.

* * * * *